US008596102B2

(12) United States Patent
Loughlin et al.

(10) Patent No.: US 8,596,102 B2
(45) Date of Patent: Dec. 3, 2013

(54) BIKE LINK FOR SECURING A BIKE

(75) Inventors: John Loughlin, Lebanon, NJ (US);
Robert Loughlin, Stanton, NJ (US)

(73) Assignee: Stanton Concepts Inc., Stanton, NJ (US)

( * ) Notice: Subject to any disclaimer, the term of this patent is extended or adjusted under 35 U.S.C. 154(b) by 0 days.

(21) Appl. No.: 13/020,984

(22) Filed: Feb. 4, 2011

(65) Prior Publication Data
US 2011/0219827 A1 Sep. 15, 2011

Related U.S. Application Data

(60) Provisional application No. 61/312,042, filed on Mar. 9, 2010, provisional application No. 61/360,282, filed on Jun. 30, 2010.

(51) Int. Cl.
*B62H 5/00* (2006.01)
*E05B 71/00* (2006.01)

(52) U.S. Cl.
USPC .............. 70/233; 70/14; 70/30; 70/49; 70/58; 70/31; 70/38 A

(58) Field of Classification Search
USPC ............. 70/14, 18, 30, 49, 53, 58, 233, 38 R, 70/38 A, 39, 278.7, 35; 292/17, 19, 1, 292/259 R, 288, 608, 609, 80, 87, 91
See application file for complete search history.

(56) References Cited

U.S. PATENT DOCUMENTS

| | | | | |
|---|---|---|---|---|
| 2,507,511 A | * | 5/1950 | Freidag et al. | 292/19 |
| 2,507,941 A | * | 5/1950 | Staley | 292/19 |
| 3,038,747 A | * | 6/1962 | Rapata | 292/17 |
| 3,061,346 A | * | 10/1962 | Jorgensen | 292/17 |
| 3,395,555 A | * | 8/1968 | Hickman | 70/39 |
| 3,780,904 A | * | 12/1973 | Stanford | 220/316 |
| 4,912,950 A | * | 4/1990 | Crowle | 70/58 |
| 5,090,222 A | * | 2/1992 | Imran | 70/63 |
| 5,916,283 A | * | 6/1999 | Steinbach | 70/456 R |
| 5,950,461 A | * | 9/1999 | Tsai | 70/38 A |
| 6,169,078 B1 | | 1/2001 | Hughes | |
| 6,430,975 B1 | * | 8/2002 | McDaid | 70/39 |
| 6,546,763 B1 | * | 4/2003 | Pielach | 70/38 C |
| 6,575,000 B1 | | 6/2003 | Li | |
| 6,813,918 B2 | | 11/2004 | Reese | |

(Continued)

OTHER PUBLICATIONS

Consumer Search/Bicycle Locks, http://www.consusmersearch.com/bicycle-locks/review Feb. 4, 2011, 11 pgs.

(Continued)

*Primary Examiner* — Suzanne Barrett
*Assistant Examiner* — David E Sosnowski
(74) *Attorney, Agent, or Firm* — Glen M. Diehl

(57) ABSTRACT

A bicycle link having one or more openings that can be π-shaped and having a slider that closes a portion of the one or more openings is disclosed. The slider can be secured in place in relation to the bicycle link with a padlock or the like being placed in aligned holes in the slide and it the portion of the bicycle link containing the slider. Cables, chains and the like are placed in the openings and secured to immovable objects. When the slider is locked in place to close a portion of the openings, this arrangement secures the bicycle.

15 Claims, 19 Drawing Sheets

(56) References Cited

U.S. PATENT DOCUMENTS

| | | | |
|---|---|---|---|
| 6,871,517 B2 * | 3/2005 | Bonelli et al. | 70/58 |
| 7,044,509 B2 * | 5/2006 | Radel | 292/91 |
| 7,181,936 B2 * | 2/2007 | Christensen et al. | 70/58 |
| 7,219,406 B2 * | 5/2007 | Chui | 24/625 |
| 2005/0092038 A1 * | 5/2005 | Becker | 70/38 A |
| 2006/0150691 A1 * | 7/2006 | Truss | 70/39 |
| 2006/0272369 A1 * | 12/2006 | Stachowiak | 70/164 |
| 2008/0276668 A1 * | 11/2008 | Stachowiak, Jr. | 70/164 |
| 2009/0064733 A1 * | 3/2009 | Liu | 70/35 |
| 2009/0113946 A1 * | 5/2009 | Baumgarten | 70/18 |
| 2009/0145186 A1 | 6/2009 | Reese | |
| 2009/0229324 A1 * | 9/2009 | Stachowiak Jr. | 70/164 |
| 2011/0219827 A1 * | 9/2011 | Loughlin et al. | 70/49 |

OTHER PUBLICATIONS

LifeLong Locks, http://www.lifelonglocks.com/products.asp Feb. 3, 2011, 6 pgs.

\* cited by examiner

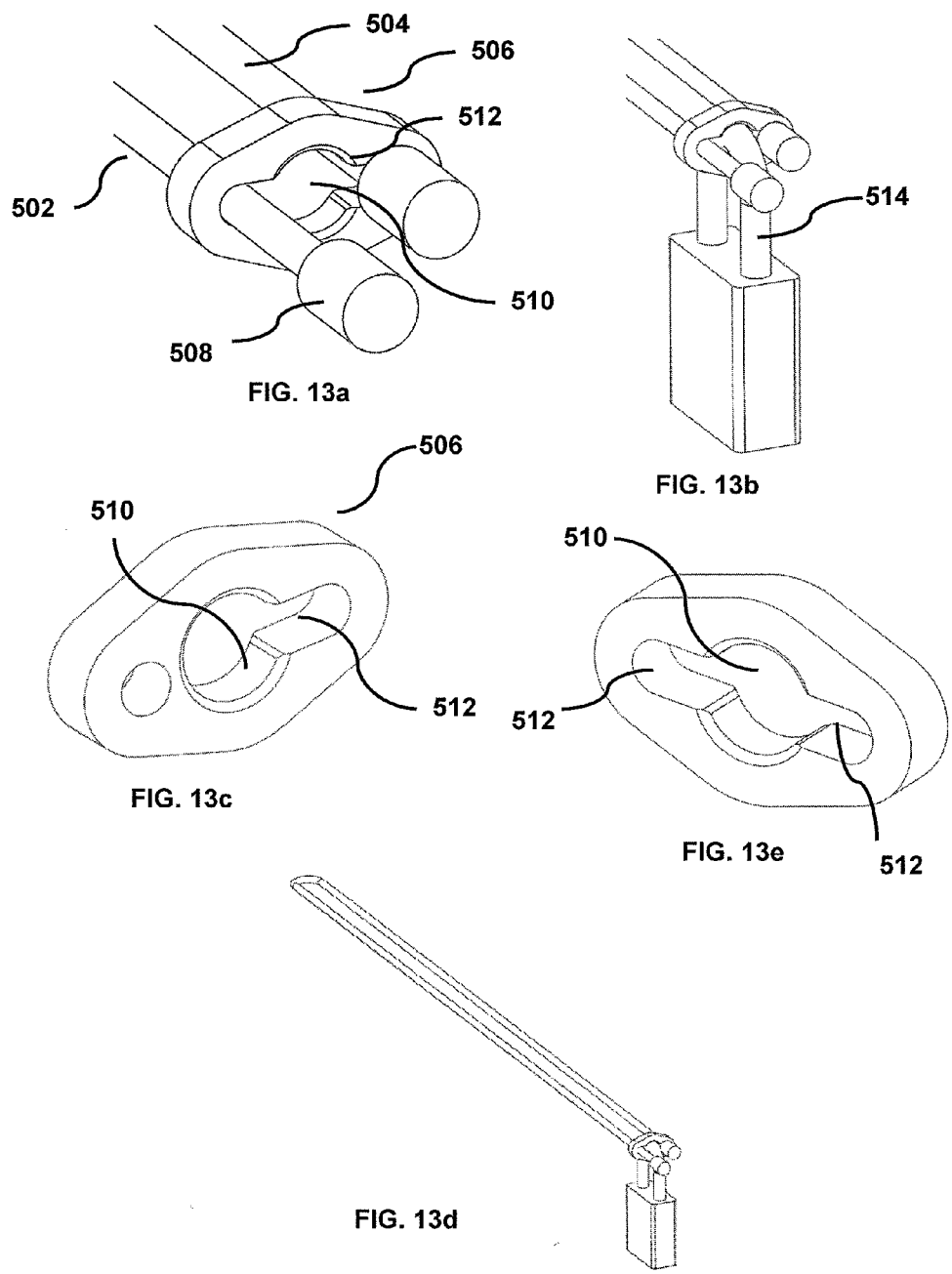

BIKE LINK FOR SECURING A BIKE

The present application claims the benefit of U.S. Provisional Patent Application Ser. No. 61/312,042 filed on Mar. 9, 2010, which is incorporated herein by reference in its entirety. The present application also claims the benefit of U.S. Provisional Patent Application Ser. No. 61/360,282 filed on Jun. 30, 2010, which is incorporated herein by reference in its entirety.

BACKGROUND OF THE INVENTION

The present invention relates in general to padlock enhancement systems. Such systems may be utilized to secure bicycles with a padlock and engaging elements, but include features to compensate for inherent weaknesses found in conventional padlocks and connecting elements of various configurations.

The systems for attachment to the bicycle frame included in the present application may be utilized for securing engaging elements such as chain, cable, or other flexible or non-flexible elements. These provide improved resistance to forced attack while maintaining ease of use, flexibility in application, minimal weight and improved cost effectiveness.

Accordingly, novel and improved methods and apparatus for securing objects like a bicycle are required.

SUMMARY OF THE INVENTION

The attachment structure that is provided as an aspect of the invention serves as a link to connect the frame of the bicycle to the engaging element, chain, cable or other to a fixed structure such as a post, pole, rack or similar substantial object. This connection is made secure by means of a generic padlock of a U shackle, rotary shackle, straight shackle, hidden shackle configuration or other "non-generic" form as appropriate to the application. The lock engages with the attachment structure and not the engaging element or elements. The padlock engagement prevents the release of the engaging element or elements by means of imposing a portion of the padlock to interfere with the release. The attachment structure may be an integral part of the bicycle frame or a separate and independent component fastened to the frame as may be appropriate to the application.

In addition to the attachment structure described above the invention includes secondary elements to facilitate this novel means for securing a bicycle. The traditional use of a loop of chain or cable represents unnecessary weight and cost. A single strand of chain or cable may be facilitated by the use of a novel link to connect the free end of the engaging element to itself to permit attachment around a pole, post, or other appropriate structure. In addition a rigid or semi-rigid member in the shape of a large U shackle may provide the means to connect to a pole, post, or appropriate structure and become secure by engaging the attachment structure. As described above the attachment structure secures these devices using the indirect engagement of a generic or non-generic padlock.

The system described above may include an attachment member that is a permanent part of the frame of the bicycle or one that may be removed. This attachment is called a bike link. This link may facilitate the use of multiple engaging elements of various sizes, and a variety of generic padlock configurations, or be optimized for specific engaging elements or padlocks to be used. This option permits a variety of embodiments to meet the requirements of cost, weight, security and other considerations dictated by the application. The concept of the bike link permits embodiments that may attach under the seat of the bike, at the steering post, or elsewhere. In the simple embodiments there are no moving parts and limited engaging element options. In the more complex embodiments there may be moving parts to provide greater flexibility in engaging elements that may be accommodated and versatility in their application.

BRIEF DESCRIPTION OF DRAWINGS

FIGS. 1 through 8 are images of proof of concept models that demonstrate the structure of a bike link in accordance with various aspects of the present invention. They also demonstrate how the bike link functions in practice in accordance with various aspects of the present invention using a variety of chain, cable and non-flexible engaging elements. The images include examples of the generic padlock configurations that are compatible with the link. The lock link and horseshoe shaped elements are also included.

FIG. 5 illustrates a Bike Link with ⅜" chain, non-looped, blocked with Lock Link element engaging and closing the chain loop at a post in accordance with an aspect of the present invention.

FIG. 8 illustrates a Bike Link with ⅜" chain blocked and secured with a Hockey Puck style padlock in accordance with an aspect of the present invention.

FIGS. 13a, 13b, 13c, 13d and 13e illustrate further aspects of the present invention.

FIG. 14a illustrates one embodiment of the invention in a locked position.

FIG. 14b. illustrates a cross section of the embodiment of 14a.

FIG. 20a is a partial section of the embodiment of FIG. 18a

FIG. 20b is a partial section of the embodiment of FIG. 18b

FIG. 20c is a partial section of the embodiment of 18c.

DETAILED DESCRIPTION

Figure 1A:
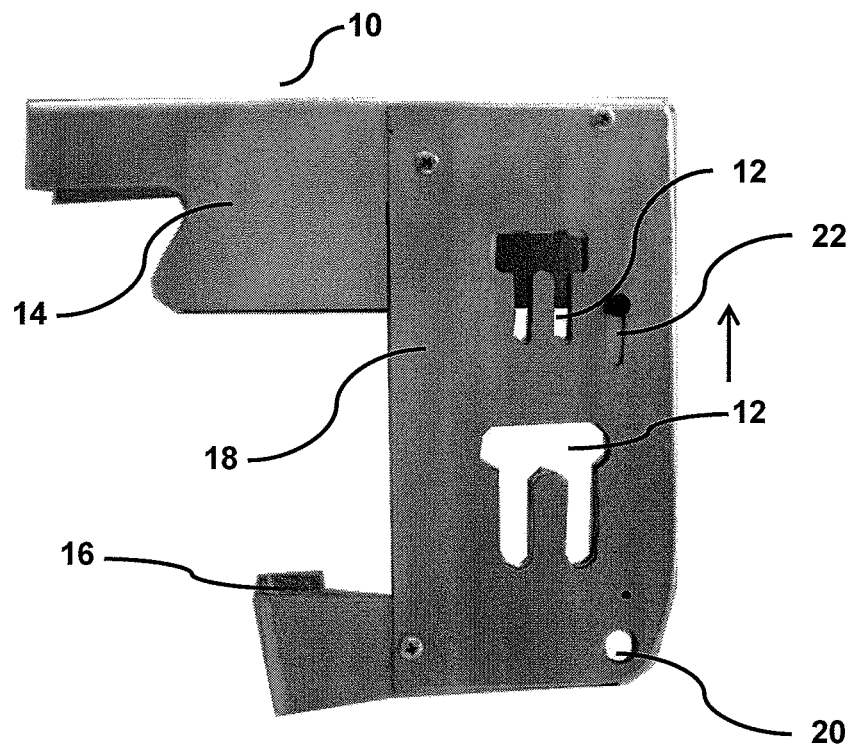
FIG. 1a illustrates a Bike Link in an open position, passages un-blocked in accordance with an aspect of the present invention.

It is well known that the "weak link" in a chain or cable lock system is often the lock itself, and therefore the lock is frequently the point of attack. For example, in the most basic systems, a U-shackle type padlock may directly secure the engaging element through a link of the chain or the loop of the cable. Depending on the padlock used, the chain or cable is often much stronger than the lock selected. The lock is often attacked by applying a torque or tension to the shackle and, by that means, to the latch within the padlock by pulling or twisting the engaging element. As an aspect of the present invention the means are provided to combat these common attack methods by the engagement of the shackle with the attachment structure independent of the engaging element to prevent the release of this element. This may include shielding of the shackle against cutting attacks that are common to the application.

More specifically, in accordance with one aspect of the present invention, the attachment structure may include a channel shaped element to securely engage a horizontal frame member of a generic bicycle and a seat post to provide a stable connection to these independent elements. This basic embodiment of the invention would also include a structure comprising three plates formed with the same pattern of security features and engaging holes of a size form and fit to accept the engaging chain, cable or other connecting element. Two plates are fabricated and fixed in alignment and spaced apart to provide a chamber between to accept the third movable plate. The structure would provide for the chain, cable, or other element to pass through the appropriate holes in all three plates when aligned and move to the appropriate engaged location. The movable center plate may then be moved in linear or rotational motion to block the engaged element and prevent them from being disengaged. With the movable plate in the blocking position the security features are in alignment to accept a locking device. These features may be holes in each of the three plates of appropriate size and location to accept the shackle of the padlock selected for the application. The padlock is engaged with the attachment structure and free of the forces experienced by the engaging elements.

The attachment structure may include a second channel shaped element to engage with the vertical post member of the bicycle frame that supports the seat and provides for a secure and stable assembly of the several elements.

The engagement holes provided in the bike link attachment structure may be of a size, shape, form and location to accept and securely engage a variety of connecting elements. These may include chain of various size, and configuration, cable terminated in a loop, or with a ferrule, or other rigid, semi-rigid or non-rigid devices that may connect the bicycle to an object or structure.

In addition the attachment structure of the invention may be engaged with the frame of the bicycle to be secured at other locations such as behind the steering post for convenient engagement with front wheel bicycle racks. The attachment may include more or less engaging holes of shape, size and form appropriate to the application.

The bike link attachment structure of the invention, including the appropriate engaging holes provides for the use of novel engaging elements. A rigid member in the form of a U shape and provided with terminating ends of the appropriate shape may securely engaged with the proper holes in the attachment structure and be connected to an object, post, pole or structure. This embodiment would be similar to the popular large U shackles currently in use.

In addition the engaging holes of the attachment structure permit the use of single strands of chain or cable with a ferrule termination engaging elements. The free end of the engaging element may be made into a loop to encircle the post, pole, or structure to be attached by means of a cruciform lock link that captures the free end and connects it to the single strand portion of the element. This is accomplished using the link of the chain or the end of a cable terminated with an appropriate ferrule. The embodiment described would be adjustable by moving the single strand portion through the link, or may be fixed and secured by the application of the appropriate padlock to the space available in the lock link. The advantage of single strand embodiments is in the savings of cost and weight.

FIGS. 1 through 8 are images of proof of concept models that demonstrate the structure of a bike link in accordance with various aspects of the present invention. They also demonstrate how the bike link functions in practice in accordance with various aspects of the present invention using a variety of chain, cable and non-flexible engaging elements. The images include examples of the generic padlock configurations that are compatible with the link. The lock link and horseshoe shaped elements are also included.

Figure 1B:
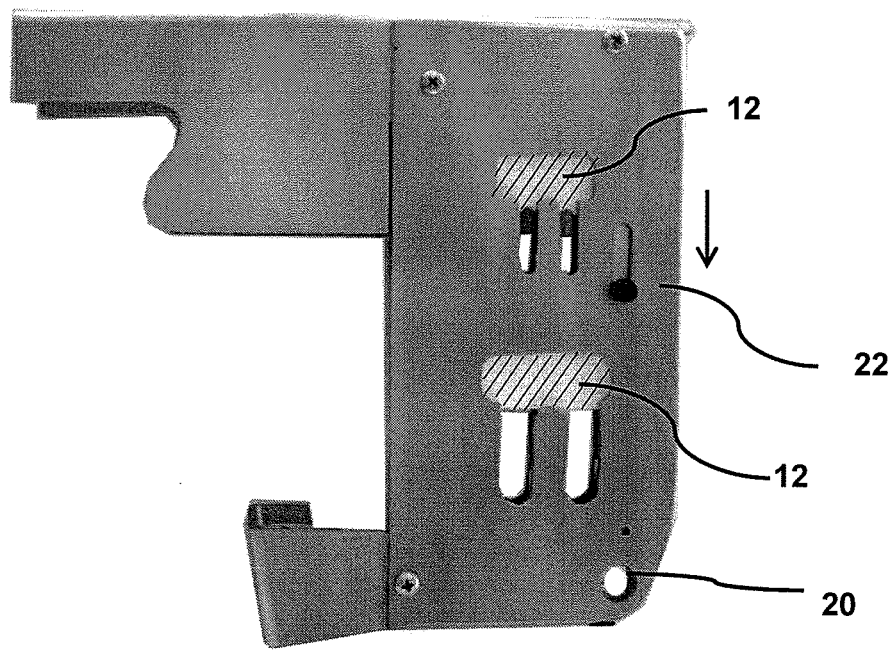
FIG. 1b illustrates a Bike Link, in a closed position, passages blocked in accordance with an aspect of the present invention.

FIG. 1a illustrates a Bike Link 10 in an open position with passages 12 un-blocked in accordance with an aspect of the present invention. As illustrated, the link includes an upper member 14 that is channeled to hold a horizontal frame member of a bike. It has a bottom member 16 that is channeled to hold a vertical frame member of a bike. The upper member 14 and the bottom member 16 are connected with a central member 18 with two openings 12. The openings 12 are π-shaped. The two openings 12 are of different sizes to allow different size chains or other securing links to be inserted. The central member 18 includes a receiving hole 20 for a padlock shackle. A slider 22 is positioned in between walls of the central member 18 to move up and down to block and unblock the openings 12. FIG. 1b illustrates the Bike Link 10, with the attachment element in a closed position, passages 12 blocked in accordance with an aspect of the present invention.

Two passages 12 are shown but there could be only one passage or more than two passages and the passages can be sized for specific attachment elements. The embodiment shown in FIG. 1a could be smaller or larger depending on the application and security threat. Also, the shape of the Bike Link in FIG. 1a is for a generic type bicycle frame, it is anticipated that the form of the Bike Link could be tailored to a specific type frame. The open passages 12 illustrated in FIG. 1, and subsequent figures illustrating this embodiment are comprised of an open section and a slotted section with a vertical member. Two slots are shown for each passage but there could be one slot or more than two slots and the slots could be of different sizes to accept different sized attachment elements. The open section is sized to accept standard, unmodified chain freely when the desired length of chain is determined one chain link is slid into one of the slots. The receiving hole for the shackle could be optimally sized for a specific lock shackle. It is also anticipated that there could be multiple receiving holes of different sizes to accommodate different locks. It is also anticipated that there could be multiple holes of the same or different sizes for multiple custody applications.

Figure 2A:
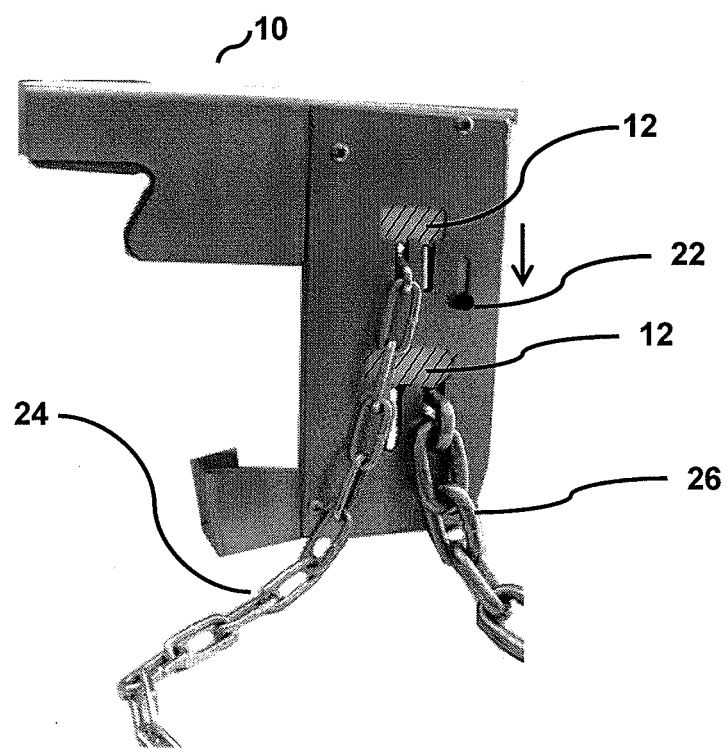
FIG. 2a illustrates a Bike Link with ⅛" and ⅜" engaged chain non-looped with passages blocked in accordance with an aspect of the present invention.
Figure 2B:
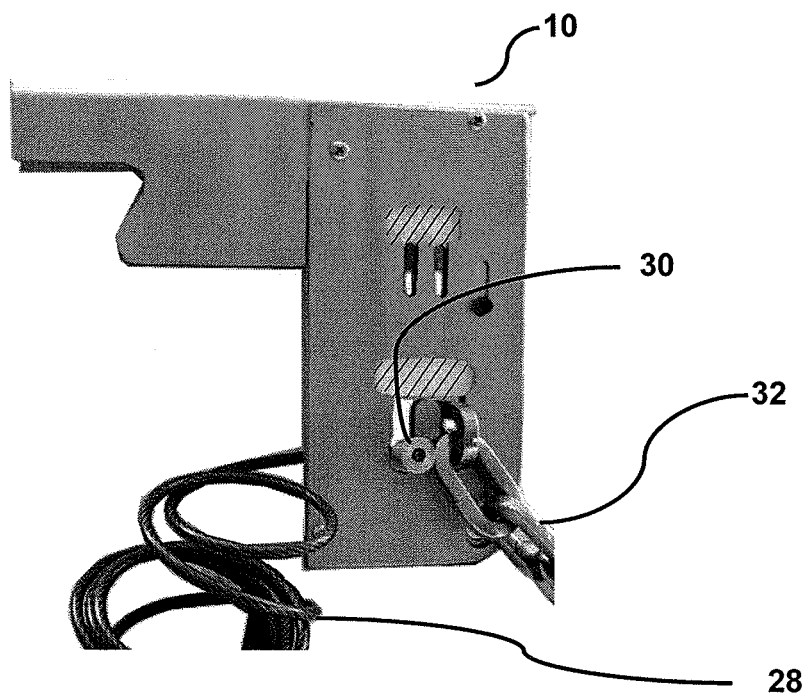
FIG. 2b illustrates a Bike Link with cable engaged by means of an engaging termination and square chain engaged with the bike link, and blocked in accordance with an aspect of the present invention.

FIG. 2a illustrates a Bike Link 10 with an engaged ⅛" chain 24 and a ⅜" chain 26 chain non-looped in the two openings 12 with the slider 22 in a locked position so that the passages 12 are blocked. FIG. 2b illustrates a Bike Link 10 with cable 28 engaged by means of an engaging termination and square chain 32 engaged with the bike link 10, and blocked in accordance with an aspect of the present invention.

The cable 28 shown in FIG. 2b is terminated with a crimped ferrule 30 but the 'pre-looped' end of a commercially available security cable 28 would also prevent the cable from being pulled through the slot 12 when the slider mechanism is in a closed position and therefore locked. The chain 32 and cable 28 shown in this figure are engaged at one end with the bike link 10, the other end, which is not shown, may be secured to an immovable object such as a bike rack, sign post or telephone pole or could be used to secure other bicycle components such as wheels and seats and accessories such as helmets and cargo.

Figure 3A:
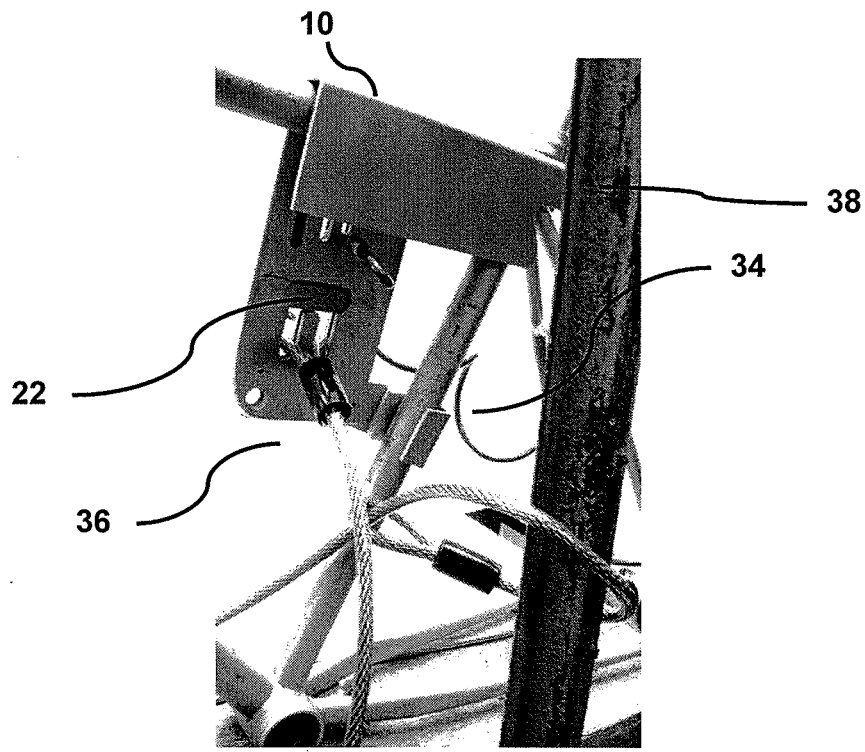
FIG. 3a illustrates a Bike Link with two sizes of cable engaged from both front and rear, small cable for wheels, large cable non-looped, and engaging a post in accordance with an aspect of the present invention.
Figure 3B:
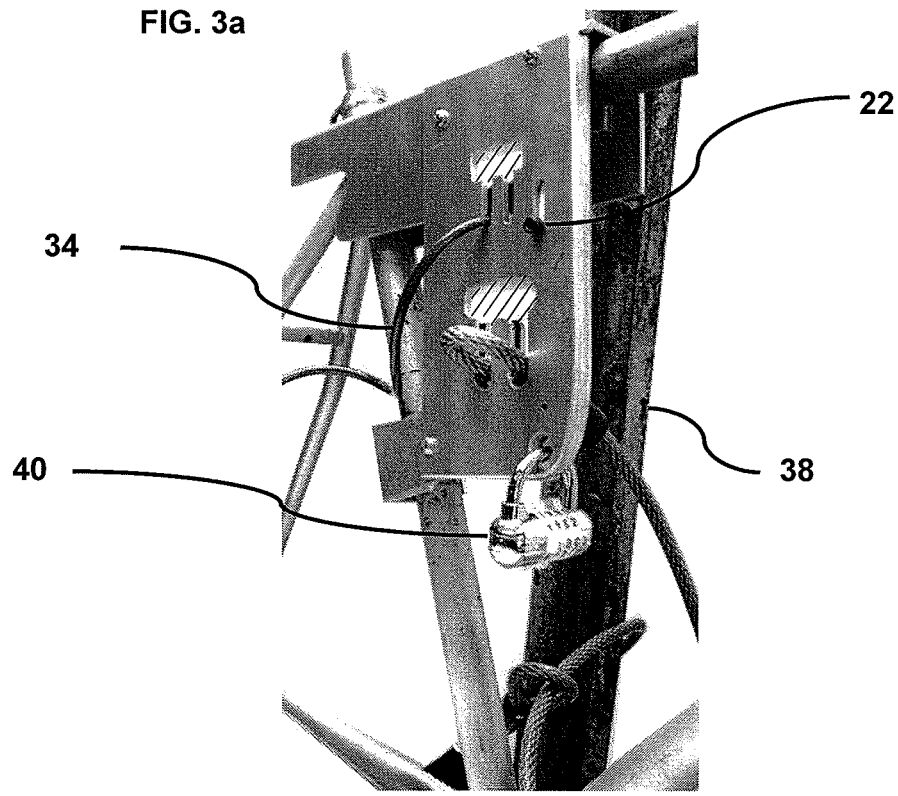
FIG. 3b illustrates a Bike Link with 2 sizes of cable, small cable for wheels or similar items, and the large cable for engaging a post in accordance with an aspect of the present invention.

FIG. 3a illustrates a Bike Link 10 with 2 sizes of cable engaged from both front and rear. A small cable is provided for wheels and a large cable non-looped is provided to engage a post to secure the bike to the post. FIG. 3b illustrates a Bike Link with 2 sizes of cable. There is a small cable 34 for wheels or similar items, and a large cable 36 for engaging a post 38 in accordance with an aspect of the present invention. A U-shackle padlock 40 with a combination lock mechanism is shown to secure the slider 22 in a down position. This type of lock is popular with bicyclists and commonly available at bicycle stores.

The large cable 36 in this figure is shown looped around a post 38, it is also anticipated that the cable could be looped around another bicycle or other object, it is also anticipated that the bike link could be used to 'daisy chain' several bicycles together. The Bike Link is shown attached to a bicycle frame, however it is anticipated that the Bike Link 10 could be attached to a fixed bike rack or a bike rack on a car or other vehicle and not on the bike itself.

Figure 4A:
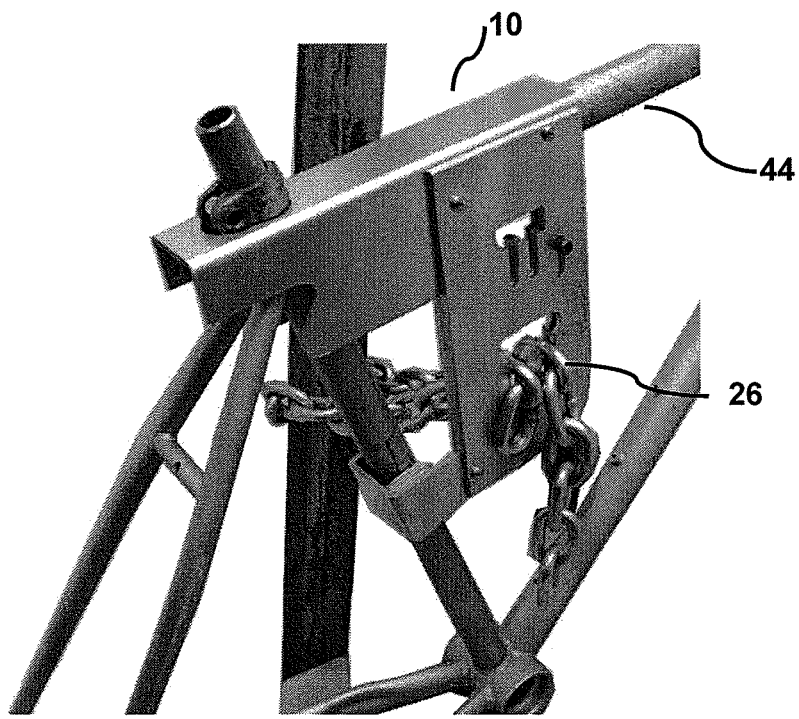
FIG. 4a illustrates a Bike Link with ⅜" looped chain, blocked, and secured with U-shackle padlock (outside view) in accordance with an aspect of the present invention.
Figure 4B:
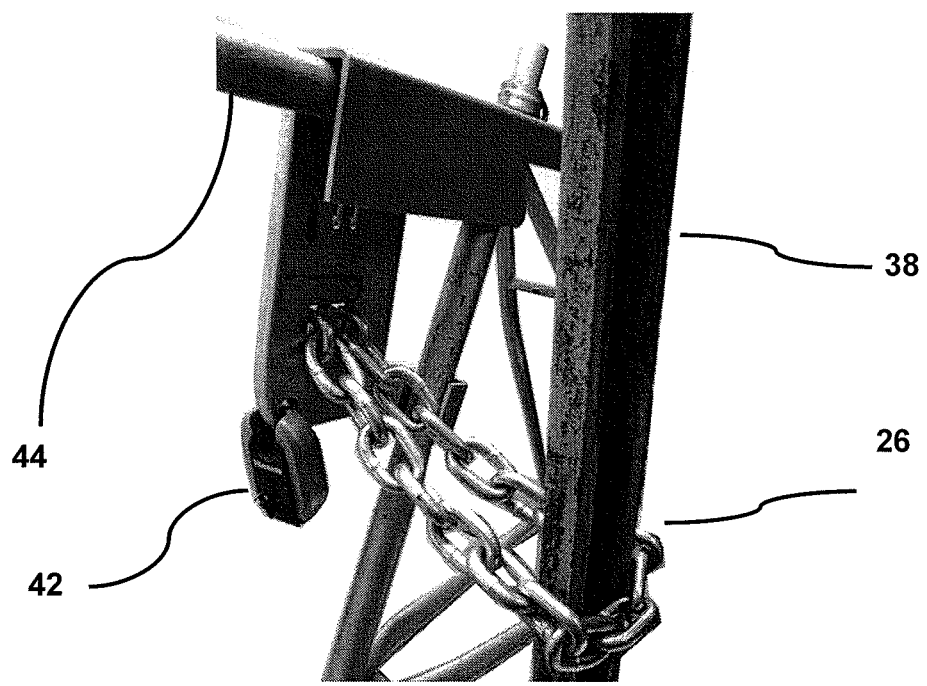
FIG. 4b illustrates a Bike Link with ⅜" looped chain, blocked, and secured with rotary shackle padlock (inside view) in accordance with an aspect of the present invention.

FIG. 4a illustrates a Bike Link 10 with ⅜" looped chain 26, blocked, and secured with U-shackle padlock (outside view) in accordance with an aspect of the present invention. FIG. 4b illustrates a Bike Link 10 with ⅜" looped chain 26, blocked, and secured with rotary shackle padlock 42 (inside view) in accordance with an aspect of the present invention.

Bigger or smaller chain can be used depending on convenience, weight and security factors. Larger chain might be used in urban settings for example. The chain 26 shown in this figure is shown looped around a fixed object, a post 38, and each end of the chain 26 secured in the bike link 10. The embodiment of the bike link 10 shown here is not removable from the bike frame 44 when the lock is in place. It is anticipated that the loop that includes the immovable object could also include frame elements of the bicycle as well. This arrangement keeps the bike secure even if the bike link 10 is removed from the frame 44.

Figure 5:
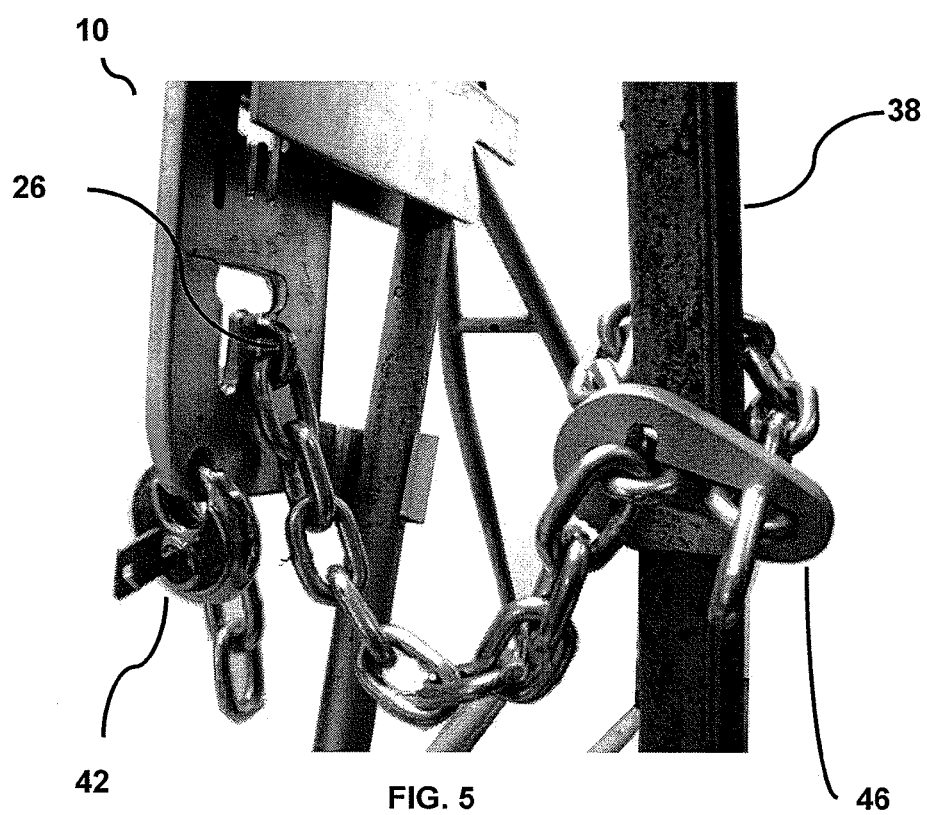

FIG. 5 illustrates a Bike Link 10 with ⅜" chain 26, non-looped, blocked with Lock Link element 46 engaging and closing the chain loop at a post 38 in accordance with an aspect of the present invention. The Lock Link element 46 enables a more efficient use of the chain. The Lock Link element 46 enables the use of a single length of chain between the immovable object and the item being secured. When chain is looped around an immovable object and both ends are secured by a Bike Link 10 or just a padlock, about twice as much chain is required.

Figure 6A:
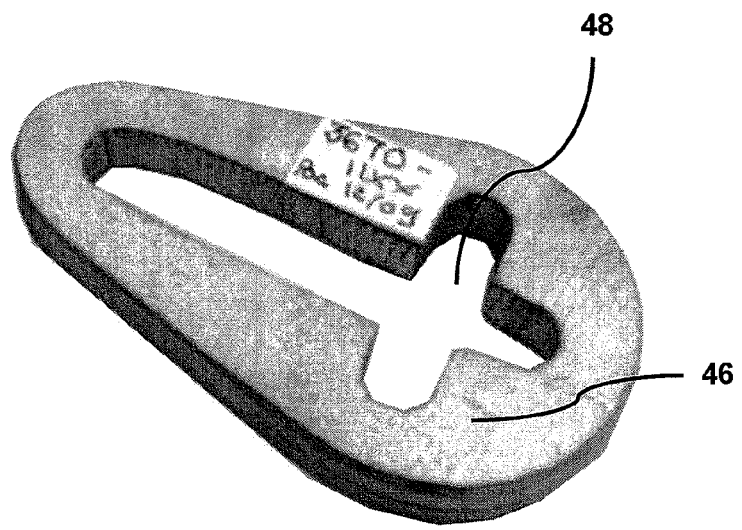
FIG. 6a illustrates a Lock Link Element for engaging chain or cable, to provide a means to create a closed loop end in accordance with an aspect of the present invention.

FIG. 6a illustrates a Lock Link Element 46 cruciform shaped opening 48 for engaging chain or cable, to provide a means to create a closed loop end in accordance with an aspect of the present invention.

Figure 6B:
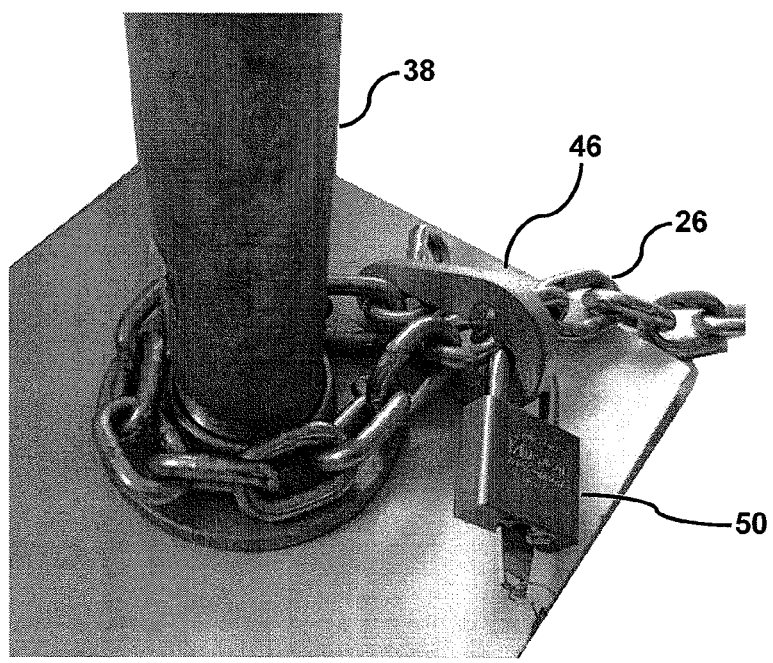
FIG. 6b illustrates a Lock Link Element engaging ⅜" chain to form a closed loop around a post and secured with a padlock in accordance with an aspect of the present invention.

FIG. 6b illustrates a Lock Link Element 46 engaging ⅜" chain 26 to form a closed loop around a post and secured with a padlock 50 in accordance with an aspect of the present invention.

Figure 7A:
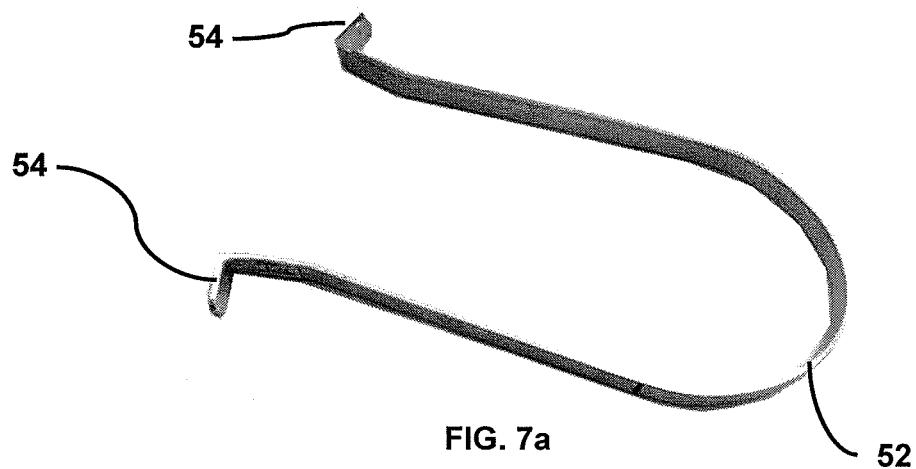
FIG. 7a illustrates a Semi-Rigid Lock Link engagement element compatible with the Bike Link to connect to a structure in accordance with an aspect of the present invention.

FIG. 7a illustrates a Semi-Rigid Lock Link engagement element 52 compatible with the Bike Link 10 to connect to a structure in accordance with an aspect of the present invention. The link 52 has two ends 54 at 90 degree angles that act as retaining structures. The link 52 could be made with any material, but is preferably made from a material with sufficient strength to prevent or at least impede cutting, breaking, melting, ultra-low cooling or otherwise unauthorized opening or destruction of the link by a malfeasant and have elastic properties appropriate to the application. Titanium is one preferred material.

Figure 7B:
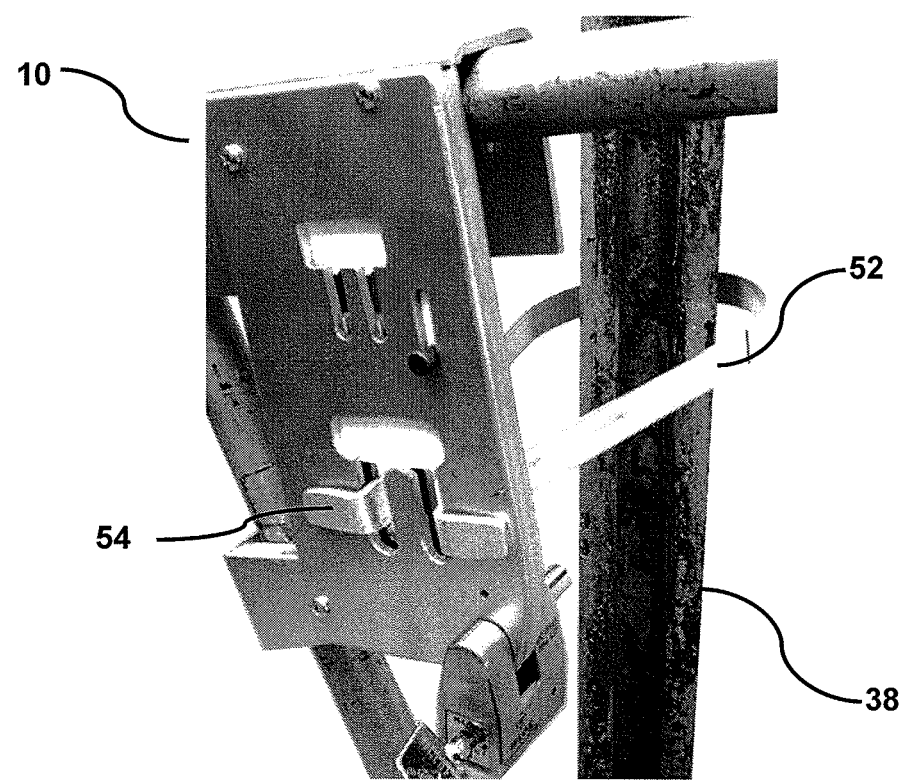
FIG. 7b illustrates a Bike Link with Semi-Rigid Lock Link engagement element (outside view) in accordance with an aspect of the present invention.

FIG. 7b illustrates a Bike Link 10 with Semi-Rigid Lock Link engagement element 52 (outside view) in accordance with an aspect of the present invention. The embodiment of the Semi-Rigid Lock Link engagement element 52 in this figure has a rectangular cross section, a generally "U" shaped profile and deformed ends to engage with the Bike Link. It is contemplated that the cross section has a different shape than a rectangle, such as a circular or oval cross section. Also, the ends could have ferrules securely crimped, welded, swaged or otherwise securely fixed or formed onto each end. The material used for the semi-rigid link may have elastic properties that allow it to deform when placed around objects larger than its U section, a telephone pole or a tree for example. Titanium alloy rod is especially well suited for this application. Titanium material is typically an expensive material and expensive to machine. However, the cost is much less if stock shapes are used with minimal secondary machining operations. One embodiment of a semi-rigid lock link could be comprised of 1/8", 3/16" or 1/4" diameter titanium alloy rod that is formed in to a general U shape with ferrous or non-ferrous ferrules securely crimped on to each end. The material properties of titanium alloys are such that it can be elastically formed around a larger object, like a sign post, bike rack, telephone pole or a tree, without significant permanent deformation, or without exceeding its yield strength. The general U shape enables convenient storage on the bicycle when not in use. It is anticipated that the semi-rigid lock link could be stored on the bicycle seat post frame member or along the top tube of the frame, compared with chains and cables which are more awkward to store on a bicycle. The material properties of grade 5 titanium compared to 304 stainless are presented below:

|  | Ti Grade 5 | 304 SS | comment |
| --- | --- | --- | --- |
| Density (Lbs/In^3) | 0.16 | 0.29 | Ti is nearly ½ the weight of SS |
| Ult. Tensile Strength (Kpsi) | 130 | 80 | Ti has 1.6 times the tensile strength of SS |
| Yield Strength (KPSI) | 120 | 30 | Ti has 4 times the yield strength of SS |
| Hardness (Vickers) | 327 | 129 | Ti is much harder than SS |

Figure 7C:
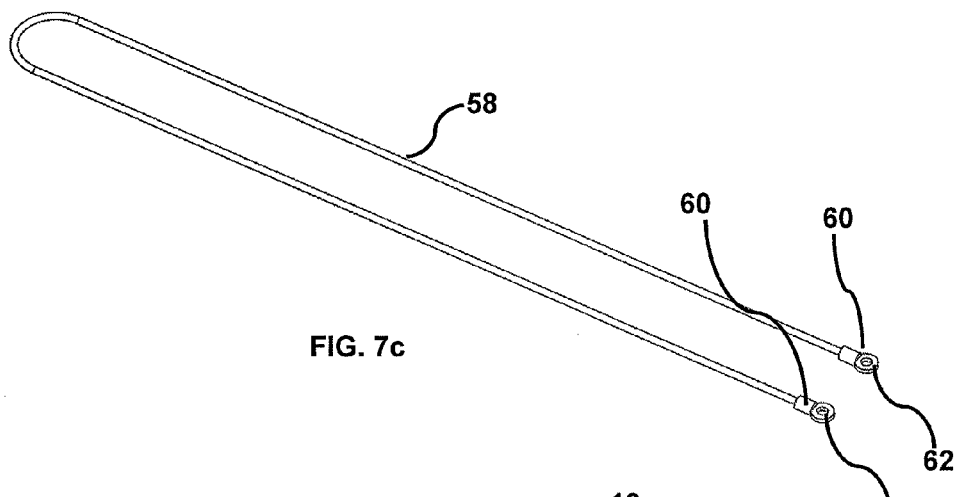
FIG. 7c illustrates a further embodiment of Semi-Rigid Lock Link engagement element.

FIG. 7c illustrates a semi-rigid lock link 58 with a circular cross section with a ferrule 60 at each end. The embodiment in FIG. 7c also has eyelets 62 on the ferrules to enable use of a padlock. The shackle of a padlock would go through the holes in the eyelets. The embodiment is semi-flexible so the middle section can bow and the ends can be brought together.

Figure 8:
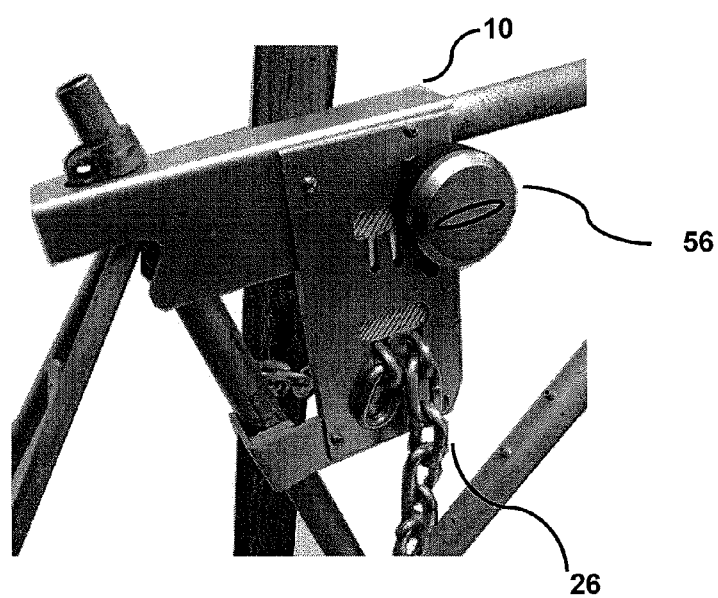

FIG. 8 illustrates a Bike Link 10 with 3/8" chain 26 blocked and secured with a Hockey Puck style padlock 56 in accordance with an aspect of the present invention.

Figure 9A:
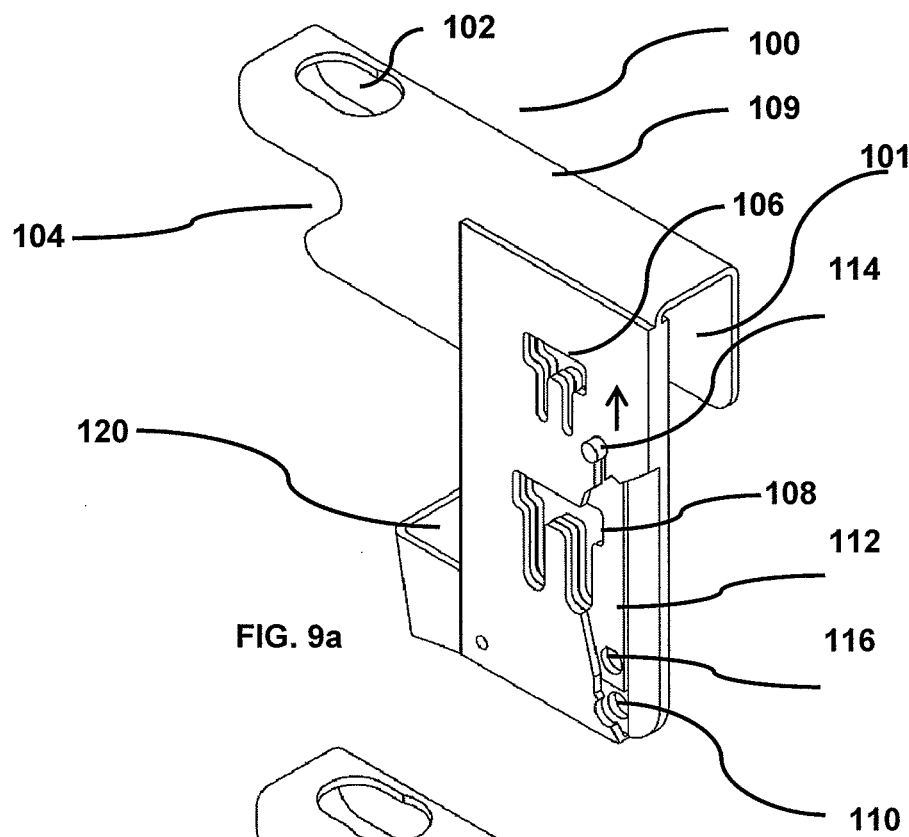
FIGS. 9a and 9b illustrates an embodiment of the bike link 100 in accordance with an aspect of the present invention.

Shown for clarity, FIG. 9a illustrates an embodiment of the bike link 100 in accordance with an aspect of the present invention, without a bike frame, padlock or attachment member. The bike link 100 in this embodiment is comprised of a top member 109, a central member 111 that contains a sliding element 112 and a bottom member 119 with a vertical channel 120. The central member 111 is partially sectioned to show how the sliding element 112 can move vertically within the shell 109. The top member 109, the central member 111 and the bottom member 119 can be formed integrally or in individual pieces that are secured together.

The bike link upper member 109 may include a clearance hole 102 for the bicycle seat post. The clearance hole 102 may be shaped to clear both the seat post as well as the seat securing and adjustment element. It is contemplated that the bike link could be mounted on a bicycle frame so that the clearance hole clears the steering post rather than the seat post. This clearance hole 102 would be dimensioned so that it would also provide clearance for the steering post. The upper member 109 features a channel 101 to rest on a horizontal member of the bicycle frame. It also has an area 104 that allows clearances from posts on the bicycle.

The bike link in this embodiment also includes a channel 120 in the bottom member 119 to capture to a vertical member of a bicycle frame. It is contemplated that this channel can be formed as part of the shell 109. It is also contemplated that it can be detachable element. It is also contemplated that it can be detached from the bike link assembly only when the bike link is in its unblocked position.

The central member 111 can have a front wall and a rear wall that form an opening in between to hold the slider 112. The slider 112 can be completely walled in by walls in the central member 111.

The bike link assembly 100 in FIG. 9a shows the slider 112 in the unblocked position. In this embodiment, the slider knob 114 is moved to the up position to unblock the small passage 106 and the large passage 108. This embodiment has two passages to accommodated different size attachment elements. However it is contemplated that the link could have only one passage or more than two passages. The passages could be dimensioned for specific off the shelf chain and/or cable or they could be dimensioned for other dedicated attachment devices. The passages 106 and 108 are preferably π-shaped, with a horizontal opening attached to two vertical openings attached to the horizontal openings.

When the slider 112 is in the up or un-blocking position, the passages 106 and 108 are clear to allow insertion of attachment devices. The hole 116 to receive the shackle in the slider is not in alignment with the holes 110.

Figure 9B:
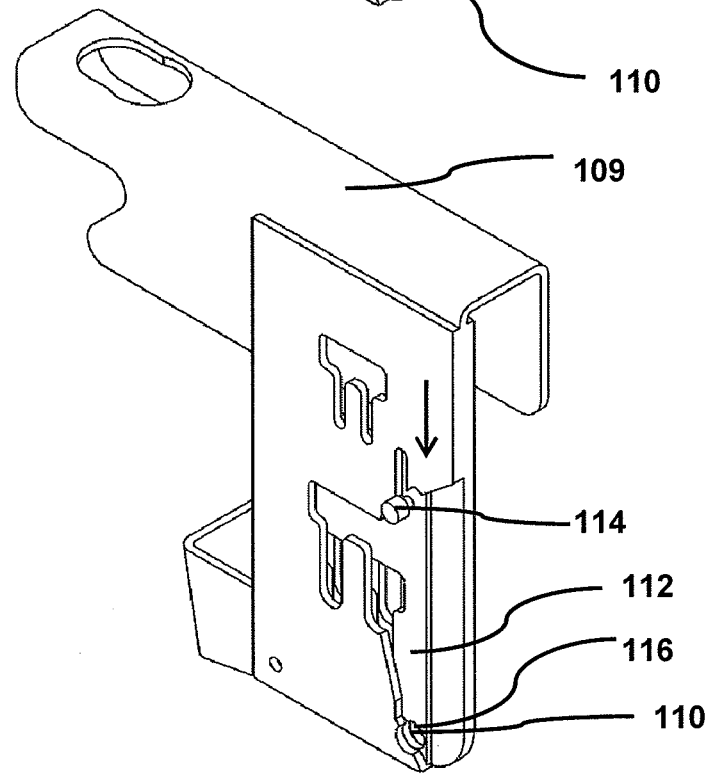

FIG. 9b shows the bike link assembly with the sliding element 112 in its down or blocking position. When the sliding element 112 is in this position the hole 116 in the sliding element is aligned with the hole 110 in the shell and a shackle of a padlock can be inserted so that the bike link can be locked in its blocking position.

Figure 10:
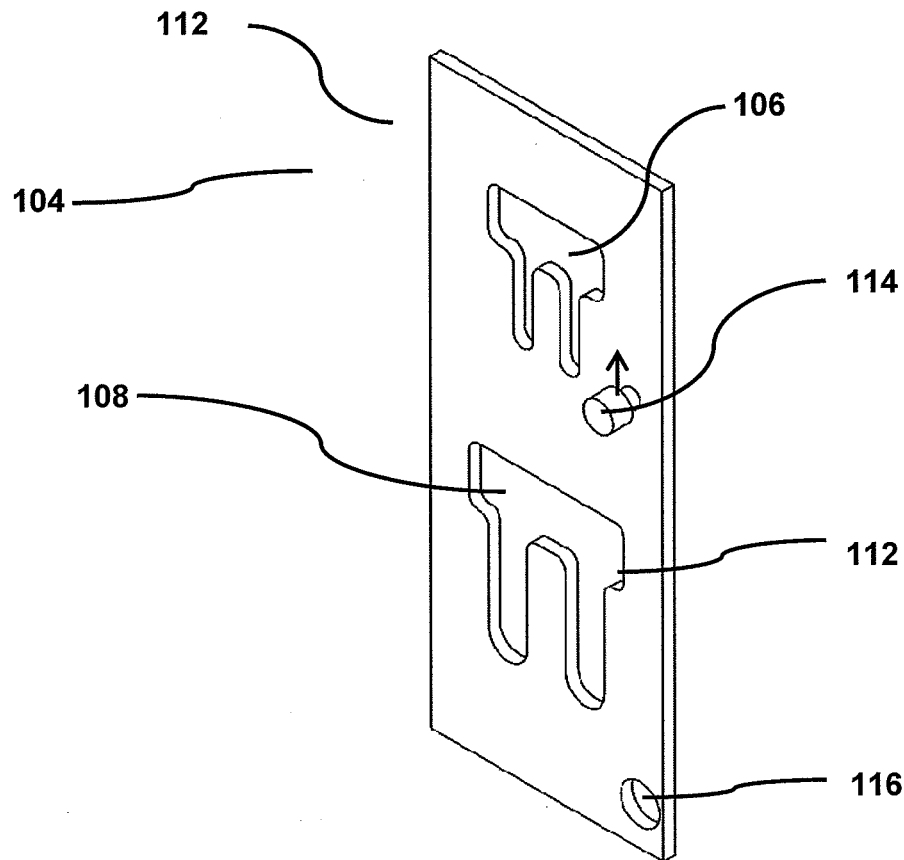
FIG. 10 illustrates one embodiment of a sliding element in accordance with an aspect of the present invention.

FIG. 10 is an illustration of one embodiment of a sliding element. The passages on the sliding element are located and dimensioned so that they block the passages of the corresponding shell when the sliding element is moved to its blocking position. It is contemplated that the knob 114 can be attached to the sliding element by riveting, welding, threaded assembly or other suitable means. It is also contemplated that knob 114 could also be formed as a hasp to accept a hockey puck style padlock.

Figure 11:
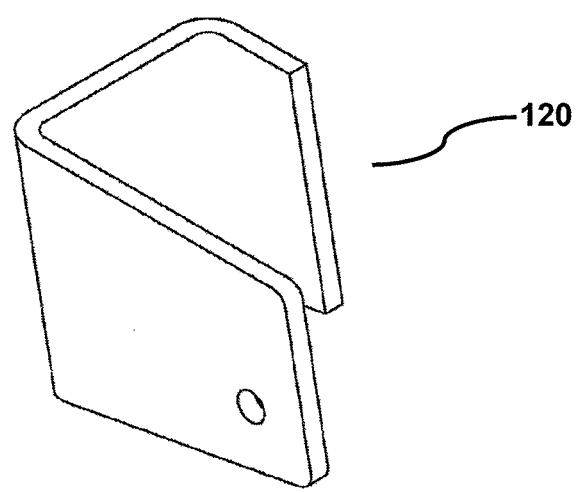
FIG. 11 illustrates a channel 120 to capture to a vertical member of a bicycle frame in accordance with an aspect of the present invention.

FIG. 11 illustrates a channel 120 to capture a vertical member of a bicycle frame. It is contemplated that this channel can be formed as part of the shell 109, it is also contemplated that it can be detachable element, it is also contemplated that it can be detached from the bike link assembly only when the bike link is in its unblocked position.

Figure 12A:
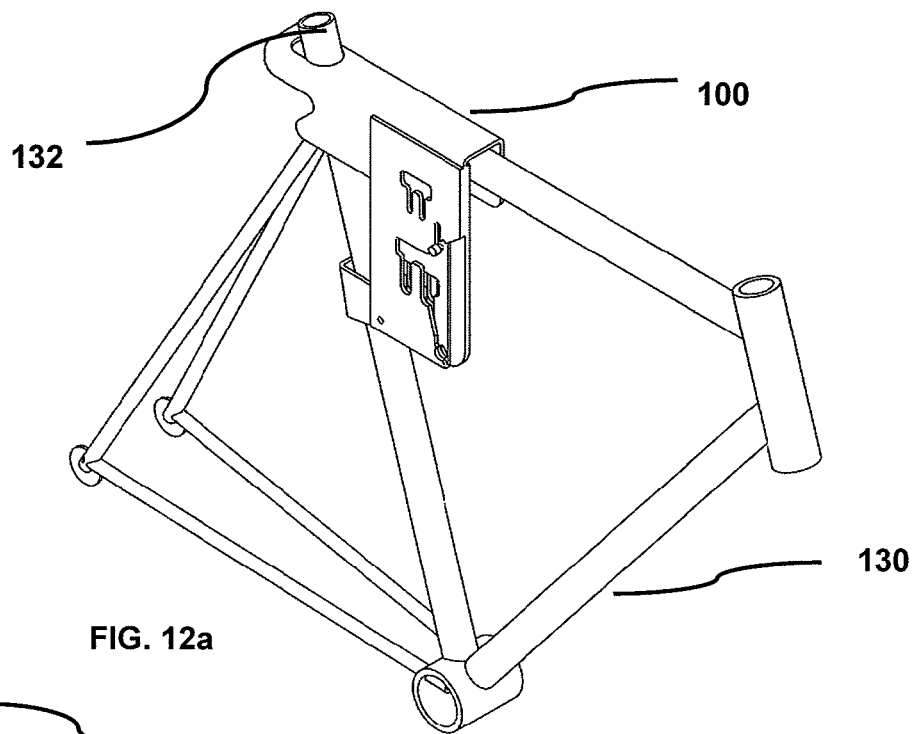
FIGS. 12a and 12b illustrate a link in accordance with one or more aspects of the present invention.

FIG. 12a illustrates one embodiment of the bike link 100 attached to a bike frame 130 toward the bicycle frame seat post 132.

Figure 12B:
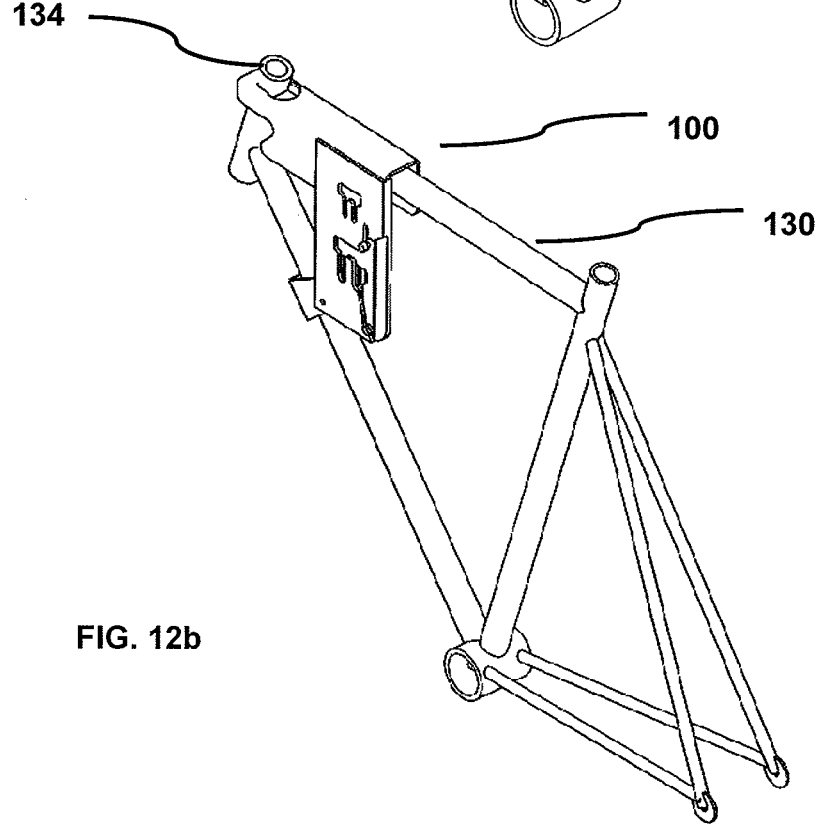

FIG. 12b illustrates one embodiment of the bike link 100 attached to bike frame 130 toward the steering post 134.

FIG. 13a illustrates another embodiment of this invention. It is similar to the embodiment shown in FIG. 7c in that it is generally 'U' shaped. The full length is not shown for clarity. In this embodiment one leg 502 is longer and one leg 504 is shorter. A hasp 506 is captured on the longer leg 502 by a securely crimped, welded, or swaged ferrule 508 or similar termination. The hasp has a hole 510 that is larger than the ferrule crimped on to 504 the shorter leg. There is a slot 512 moving out from the hole 510 that is larger than the leg diameter but smaller than the ferrule. The smaller leg 504 can be engaged in the slot 512 when the hasp 506 is slid forward and the semi-rigid link is compressed enough to align the ferrule on the shorter leg with the hole 510. When the ferrule and hole are aligned, the hasp 506 can be slid back until the ferrule clears the hole 510 and the semi-rigid link is un-sprung and the shorter leg rests in the slot 512.

FIG. 13b illustrates that when a padlock shackle 514 is engaged with the hole, the shorter leg 504 is trapped and cannot be removed. This arrangement provides a secure continuous loop suitable for locking a bicycle or other objects to a fixed object or two or more items together.

FIG. 13c illustrates the hasp by itself.

FIG. 13d illustrates the full assembly.

FIG. 13e illustrates an embodiment of the hasp that has slots on both sides of the hole for the shackle. This embodiment allows the hasp to be removed from the assembly. It also allows the use of multiple hasps per assembly.

Figures 14A, 14B:
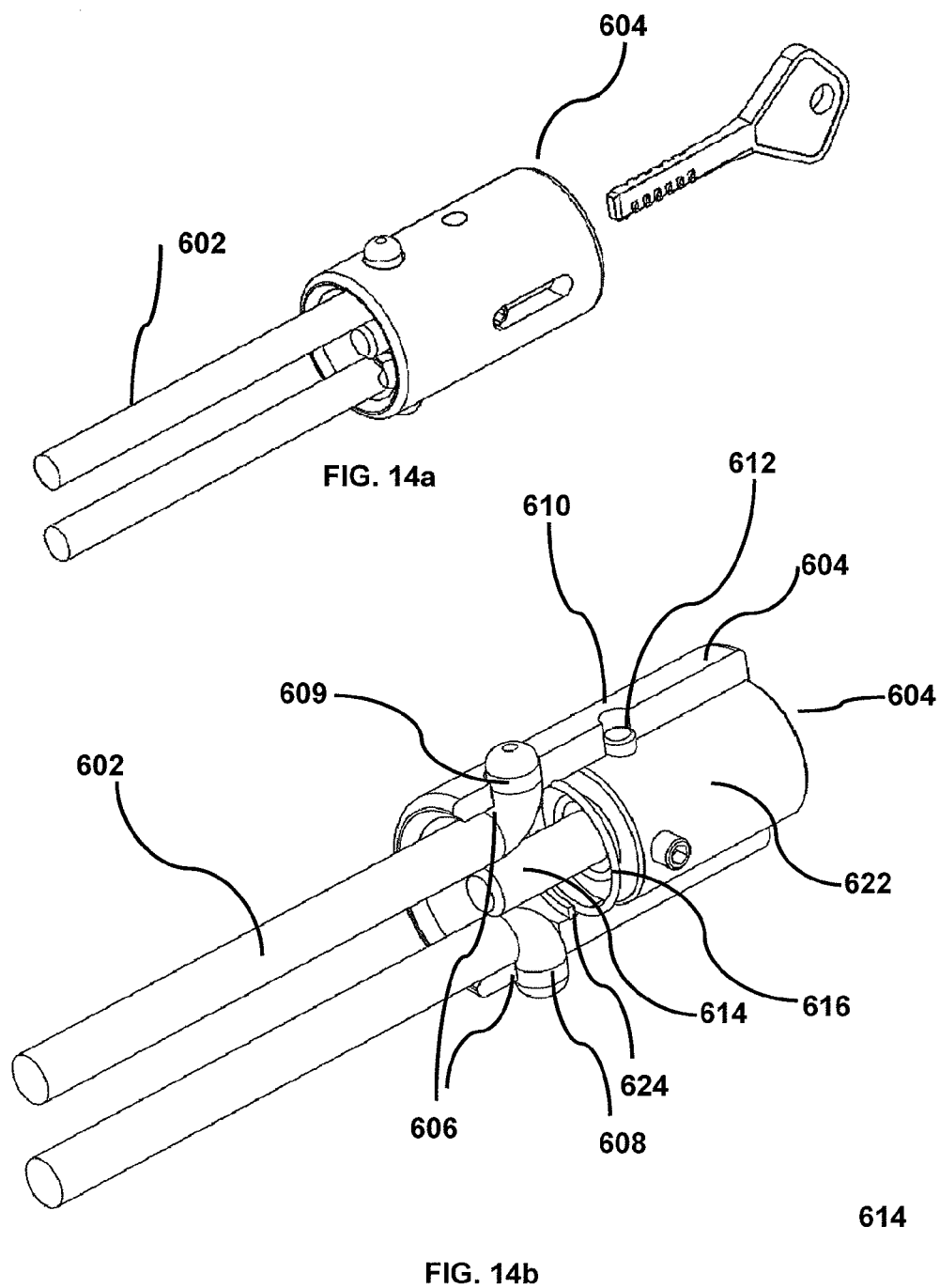
Figure 15:
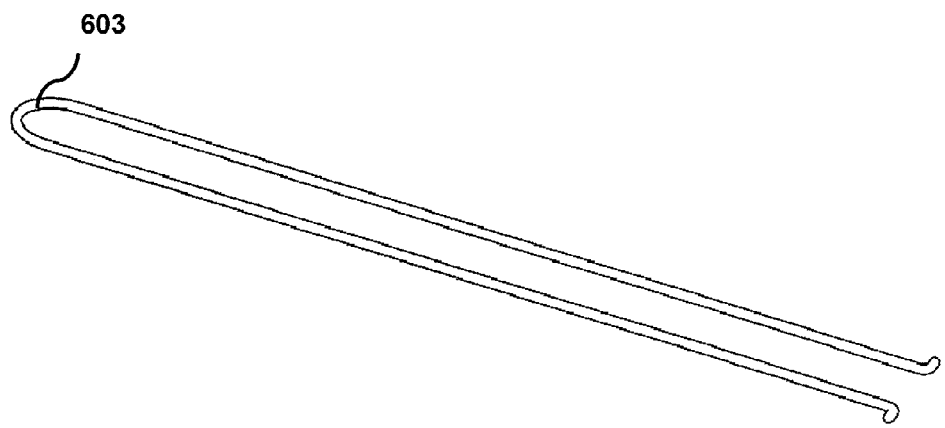
FIG. 15 illustrates a U-shaped member in accordance with one aspect of the present invention.

FIG. 14a and FIG. 14b illustrate another embodiment of the present invention comprising a member 602 and a locking mechanism 604. FIG. 14b is cutaway of FIG. 14a. In accordance with one aspect of the present invention, the member 602 is U-shaped. In FIG. 14b, the top U-shaped portion 603 of member 602 is not shown, but it is shown in FIG. 15. The member 602, in accordance with one aspect of the present invention, is metallic. In accordance with a further aspect of the present invention, the member 602 comprises an elastically deformable material that returns to its original shape or nearly it's original shape after deformation. It has a first end, a second end, a first engaging element 608 formed on the first end and a second engaging element 609 formed on the second end. Elastically deformable means that the member is capable of bending or flexing, but that the member returns to its original or near original shape when the load is removed. In addition to providing versatility in terms of what the flexible member can be "bowed" around, it also has the benefit of diminishing the effect of a "jacking" attack. A "jacking" attack is when a car jack or similar apparatus is placed between the rigid legs of a conventional lock to break the lock. The lock in accordance with various aspects of the invention described herein is not vulnerable to this attack The embodiment of FIG. 14b can secure an object to a structure, including objects and structures of varying shapes and sizes. For example, the embodiment of FIG. 14b can secure a bicycle to a structure, such as a bike rack, sign post or a tree, by the member 602 surrounding both the bicycle (at least a portion of the bike) and the structure. Since the member 602 is elastically deformable, it can secure the bicycle to a structure that is wider than the opening between the two legs of the member 602. It is anticipated that other sizes and shapes may be used for other application such and securing skis, snow boards, skate board etc. It is anticipated the lock can be sold as a kit that includes one or more shackle embodiments. It is also anticipated that the invention can have a size and shape suitable for industrial and commercial applications such as securing doors on intermodal shipping containers and barn door style truck trailer doors.

The embodiment of FIG. 14b preferably has a protective sleeve or coating, not shown for clarity, covering at least part of the member 602. The sleeve is, in one embodiment, made of Kevlar. The sleeve protects a bike frame from scratching, but it also diminishes stress concentration during a bolt cutter attack. It can also make a sawing attack more difficult . . . it is anticipated that the coating could be a transparent, translucent or opaque polymer.

The material forming the member 602 can be titanium, titanium alloy, steel, alloy steel, beryllium copper, aluminum or aluminum alloy. The material can be treated or untreated. It is anticipated that the member could also be a lamination or composite of different materials including non-metallic materials. Various grades of these materials can be used. For example, titanium of grade 2 and grade 5 are well suit to this application The embodiment of FIG. 14b has a member leg 602 with an engaging element 608 on the first end and an engaging element 609 on the second end. The engaging elements 608 and 609 can be formed by a bend of an end section of each of the legs of the member in any direction. In accordance with one aspect of the invention, the bends are provided in diametrically opposite directions. The first end and the second end can therefore extend from the legs of the member at various angles. In one embodiment the first end and the second end can extend at an angle between 30 and 120 degrees from the member 602. In a further embodiment they can extend at an angle between 60 and 100 degrees from the member 602. In yet a further embodiment, the engaging elements 608 and 609 extend at approximately a 90 degree angle from the member 602. Other angles are possible and fully contemplated.

The embodiment of FIG. 14b further comprises a locking mechanism 604 comprising a means for retaining the first engaging element 608 and the second engaging element 609 and a lock. The means for retaining the first engaging element 608 and the second engaging element 609 can be a single assembly, multiple pieces, or discrete members. The locking mechanism 604 can be a piston lock having an axially moving bar also referred to as a plunger or shaft 614 that extends out in a locking position and that is brought back into the cylinder 604 in an unlocked position. Thus, the moving shaft 614 is positioned between the engaging elements 608 and 609 in a locked position and retracted in an unlocked position to allow the engaging elements 608 and 609 to be squeezed, disengaged and removed from the locking mechanism. The position of the shaft 614 is controlled by a key by way of the lock cylinder 622. It is anticipated that the lock mechanism may be a combination lock mechanism rather than a key mechanism.

The shaft shown in FIG. 14b has a round cross section. It is anticipated that the shaft has cross section other than a circle. It is anticipated that the shaft has a hexagonal cross section with a distance of 0.25 inches across the flats. This size of hexagonal cross section is commonly used for interchangeable screw driver bits and other hardware. 0.125 is also a common size for tool bits. The shaft could also have a smaller hexagonal cavity such as 0.125 inches across the flats along it's center line. This would allow the lock 604 to double as a tool holder. This is advantageous because cyclists are concerned with weight and the amount of equipment carried. The dual function of the lock body could eliminate the need for a second piece of hardware.

In accordance with an aspect of the present invention, the means for retaining the first engaging element and the second engaging element are two holes 606 in a shell 620 that retains the piston lock 622. It is anticipated that there can be more than 2 holes in a shell to accommodate multiple members at the same time. The piston lock is sometimes referred as a plunger, barrel or push style lock cylinder. Two commercial examples of this style padlock include Real Locks & Security Co. LTD RL-8091 series of cylinders and Assa Abloy OF432N series of lock cylinders. See, also U.S. Pat. Nos. 6,169,078, 6,575,000, 6,813,918 and publication no. 2009/0145186.

FIG. 14b illustrates the locking mechanism in a locked position. In the locked position, the shaft 614 extends into the space between the holes 606 inside the shell 620. The shaft 614, when extended in the locked position, fills the void between the first engaging member 608 and the second engaging member 609 to secure the first engaging element 608 and the second engaging element 609 in the holes 606 in the shell 620.

In the locked position, the lock cylinder 622 extends into the shell 620 and the shaft 614 extends upward to fill the void between the holes 606. A helical compression coil spring 616 is compressed (fully or partially) between a retaining ring 624 and the top of the lock cylinder 622. The position of the shaft 614 and the lock cylinder 622 inside the shell 620 is secured by a locking pin 612. The locking pin 612 is retained in a hole 610 in the shell 620. The pin 612 extends into a corresponding hole in the lock cylinder 622. The locking pin is retracted when the correct key is inserted and rotated in the cylinder. It is anticipated that a suitable combination lock mechanism could also be used. When the pin retracts, the spring pushes the cylinder 622 and the shaft 614, thereby moving the locking pin 612 out of alignment with the hole 610. The locking pin is also spring loaded so that when the cylinder 622 is pushed back into the shell 620, the pin 612 snaps into the hole 610 in the shell 620 to secure the cylinder 622 in its lock position. It is anticipated that the hole in the shell could be a 'blind' hole (as opposed to a through hole) to thwart a drill attack, or other types of attacks, on the pin. Thus, the hole in the shell can be covered and is preferably a blind hole. It is also anticipated that inserts of hard material such as tungsten carbide or ceramic be pressed in the hole to counter drilling attacks.

FIG. 15 illustrates the member 602 in accordance with one aspect of the present invention. The member 602 may have a cross section of any shape, but is shown with a solid circular cross section. Other cross sections such as oval or rectangular could also be employed. These may be more resistant to bolt cutting attacks. The cutting jaws on commercial bolt cutters are typically less than 1", a rectangular cross section with a wide dimension greater than 1" would lessen or eliminate the effect of a bolt cutter attack. The long-short dimensions could be oriented to not adversely affect the flexibility (see FIGS. 7a/7b). The overall shape of the member 602 can be any shape, but in one embodiment, as shown in FIG. 15, is U-shaped having an open and a closed U shaped end 603. The legs of the U-shape in FIG. 15 are of equivalent length. The legs of the U-shape member have a width approximately within the range of 2 mm and 15 mm, preferably between 6 mm and 10 mm, and most preferably 6.5 mm, this dimension provides a good combination of light weight, strength and flexibility for a bicycle lock application. The length of the U-shape member is approximately within the range of 30 cm and 90 cm, preferably within the range of 40 cm and 70 cm, and most preferably 60 cm. 60 cm is preferred because for a typical road bike both wheels and the frame can be secured to an object with-out removing either wheel. The inside diameter of the un-flexed U-shaped member in accordance with one aspect of the present invention, is within the range of 1 cm and 25 cm and preferably within the range of 4 cm and 13 cm. In accordance with another aspect of the present invention, the arms of the U-shaped member 602 can be further apart from each other at the open end of the member 602 than at the closed end of the member 602.

Figure 16:
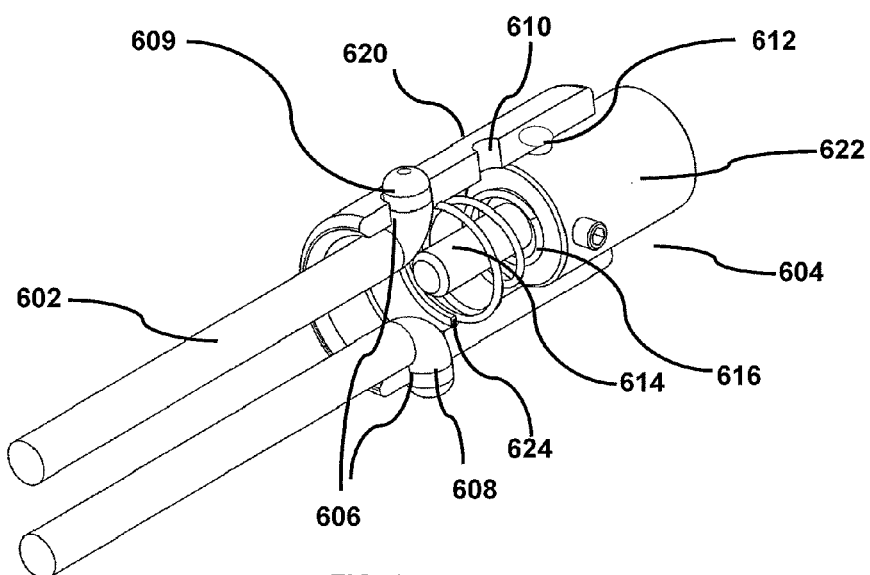
FIG. 16 illustrates the embodiment of FIG. 14b in an unlocked position.

FIG. 16 illustrates the locking mechanism 604 in its unlocked position. A key, not shown, is used to turn the lock cylinder 622 to an unlocked position and the shaft 614 and the lock cylinder 622 are moved downward in the shell 620. This allows the shaft 614 to be moved out of the void between the holes 606. In this position, the first engaging element 608 and the second engaging element 609 have sufficient room to disengage from the holes 606 in the shell 620 when the arms of the U-shaped member 602 are squeezed together. In the unlocked position, pressure on the helical compression coil spring 616 is relieved because the coil 616 is less compressed between the retaining ring 624 and the lock cylinder 622.

Not visible in FIG. 14b or FIG. 16 is a set screw in the lock cylinder 622 which, in conjunction with a slot in the shell, keeps the assembly intact and keeps the locking pin 612 in rotational alignment with the hole 610 in the shell.

Figure 17:
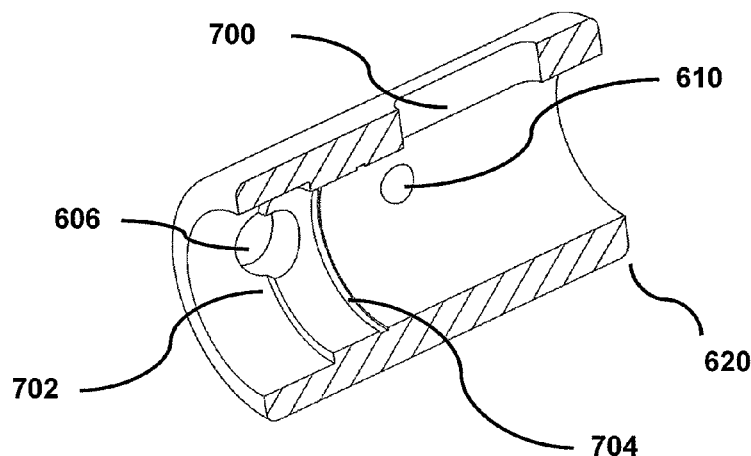
FIG. 17 illustrates a shell of the piston lock as used in the embodiment of FIG. 14b.

FIG. 17 illustrates a cross section of the shell 620 of the locking mechanism 604 of the embodiment of FIGS. 14 and 16. It comprises a slot 700 for a set screw, two holes 606, only one shown, for the first engaging element and the second engaging element, a lip 702 to guide the first engaging element and the second engaging element into the holes 606, locking pin hole 610, and a slot 704 for the washer (or retaining ring) used to retain the coil and lock cylinder. The set screw can be a pin, etc. The slot is shown going through the shell 620, but it could also be only partially through.

Another embodiment of the present invention comprises a padlock and a plate for the locking mechanism, as illustrated in FIGS. 13a to 13d. The plate comprises an aperture that receives the first engaging element, the second engaging element, and the moving bar. The moving bar being a shackle of the padlock. When locked, the shackle of the padlock fills in the center of the aperture so as to retain the first engaging element and the second engaging element. When unlocked, the shackle is removed, and the first engaging element and the second engaging element have sufficient room to disengage from the plate.

Figures 18A, 18B, 18C:
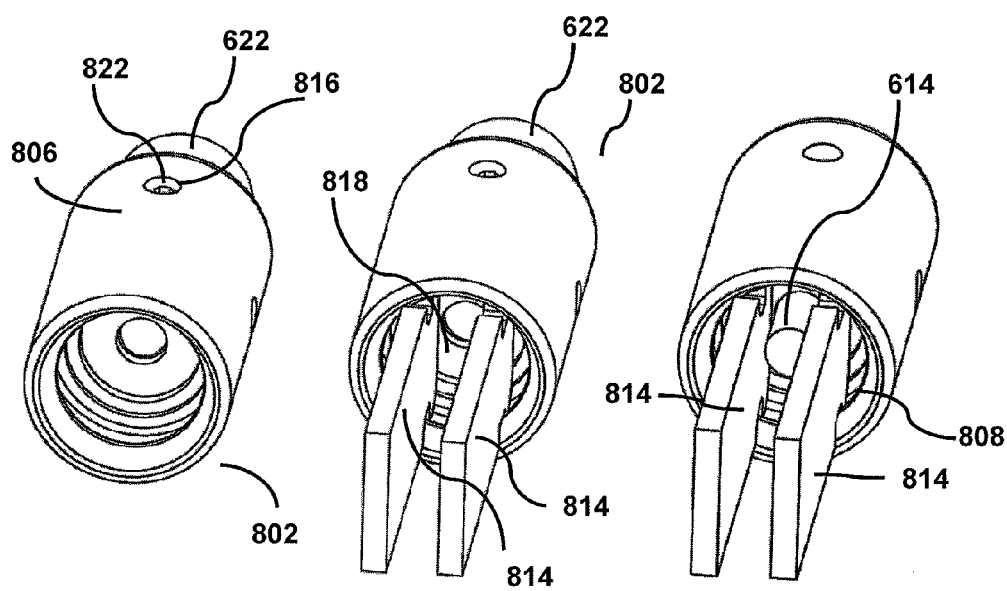
FIG. 18a illustrates one embodiment of the invention in an unlocked position.
FIG. 18b illustrates the embodiment of FIG. 18a with the tips of a member engaged and in an unlocked position.
FIG. 18c illustrates the embodiment of FIG. 18a in a locked position.

FIGS. 18a, 18b and 18c illustrate another embodiment of the invention where the flexible member is engaged in the shell 806 and retained when the shaft 614 of the lock cylinder 622 is pushed forward. The tips 814 of the flexible member with a rectangular cross section move radially outward and notches or other features on the tip of the flexible member are engaged with an internal ledge 808 in the shell 806. When the lock cylinder 622 and shaft 614 are pushed forward the void 818 between the tips 814 is filled and the flexible member is blocked from removal and secured to the lock body 802. One advantage of this embodiment is that when locked the lock body 802 is still free to spin relative to the flexible member. This neutralizes a torsional attack against the lock body. This embodiment is also well suited to a flexible member with a rectangular cross section. It is anticipated the embodiment shown FIGS. 18a, 18b and 18c could also have holes like the embodiment shown in FIGS. 14a and 14b to accept a flexible element like shown in 15 in addition to a rectangular cross section.

FIG. 18a shows the lock body 802 with the lock cylinder 622 and shaft 614 in the un-locked state, also known as the retracted state. This embodiment is depicted with the same style of keyed cylinder as the embodiment shown in FIGS. 14a and 14b, however it is anticipated that other styles of lock cylinder can be employed, including combination or electro-mechanical lock system.

The shell 806 could be metallic, non-metalic, a polymer or a composite of different materials. The shell 806 could be fabricated by molding, casting or machining or other suitable method. The shell 806 is shown round but it is anticipated that it could be a polygon or some other shape or have sections with different shapes. A shape other than round may prevent the lock body from rolling when it is detatched from the flexible element. It is also anticipated that the lock body have an overmold of plastic.

FIG. 18a shows that when the cylinder 622 is in its retracted state a set screw 822 to retain the lock cylinder 622 is accessable through a access hole 816 in the shell 806. This allows the lock cylinder 622 to be removed from the shell 806 only when the lock is un-locked. This feature facilitates the lock cylinder 622 being replaceable.

FIG. 18b shows the lock body 802 with the lock cylinder 622 in a retracted state and the tips 814 of a flexible member inserted into the engagement cavity 818.

FIG. 18c shows the tips 814 engaged in the lock body 802 with the lock cylinder 622 and shaft 614 inserted in it's locked state. In the locked state the shaft 614 fills the void between the tips 814. In the locked state the tips are captured in the lock body and cannot be removed. FIG. 18c shows that when the lock cylinder 622 is in it's locked state the set screw 822 is no longer accessible through the access hole 816.

Figures 19A, 19B:
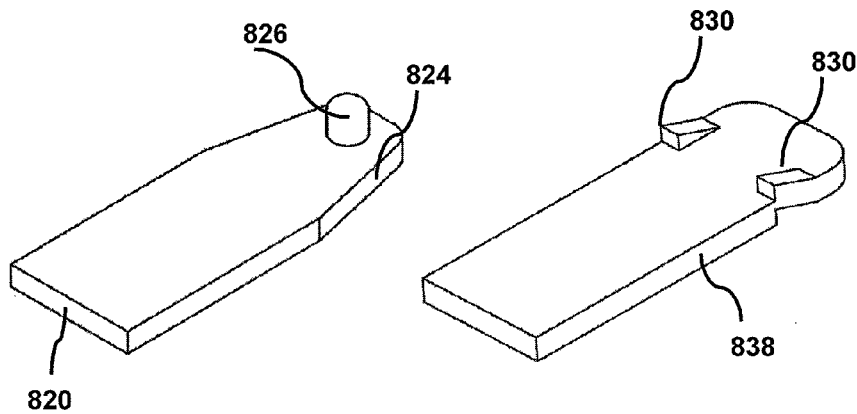
FIGS. 19a, 19b, 19c, 19d, 19e and 19f illustrate further embodiments of this invention.

FIGS. 19a, 19b, 19c and 19d show 4 different tip configurations for a flexible element with a rectangular cross section 820. FIG. 19a illustrates a tip that has a taper 824 dimensioned to allow insertion and engagement with the lock body. This embodiment has protrusion 826 that when the flexible member in inserted into the cavity in the lock body the protrusion 826 engages with an internal groove with a ledge. The groove allows the tips to move radially outward and the ledge blocks the protrusion and prevents the flexible members' tips from being removed when the lock cylinder and shaft are in the locked position. The embodiment shown in FIG. 19a has a protrusion that is round but it is anticipated that it could be another suitable shape. The protrusion could be comprised of a pin press fit into the tip or could be affixed in some other suitable way.

FIG. 19b depicts a tip with a protrusion 830 feature that is formed by displacing material from the flat section. It shows the protrusion 830 on both sides of the tip. It is anticipated that the protrusion could be on just one edge 838 of the tip.

Figures 19C, 19D:
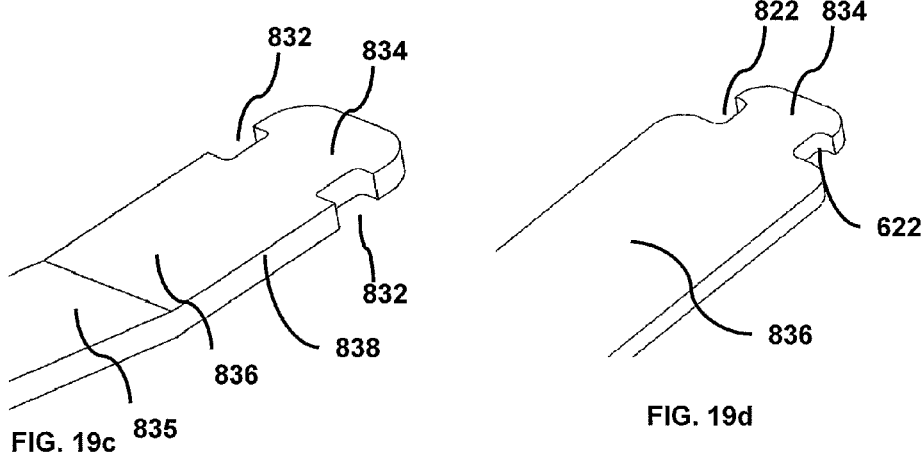

FIG. 19c shows a preferred embodiment of the tip where notches 832 engage with the ledge to retain the flexible member in the housing. In this embodiment the end of the tip 834 has the same width as the rest of the member 836. This embodiment may have a lower manufacturing cost than other embodiments. The width of the tip 834 is such that when the tips of the flexible member are squeezed they can be inserted in the cavity in the shell. When released or un-squeezed the tips spring radially outward and the notches straddle the ledge. It is anticipated that only one notch 832 on one edge 838 of the tip may be employed. This embodiment also includes a slight bend or flair 835. When the tips 834 of a flexible member are squeezed together it is desirable to have the two tips generally parallel to each other to facilitate insertion into the lock body and pushing the lock cylinder and shaft into their locked position. For a U shaped flexible member that is about 24 IN long and an inside diameter of 2.5 IN the flair angle might be 2-3 deg for each tip.

FIG. 19d shows a tip 834 with a width less than the rest of the flexible member 836. The member 836 could be of any suitable width but a preferred width would be wider than the cutting capacity of a typical bolt cutter, rendering this type of attack ineffective, or not fully effective.

Figures 19E, 19F:

FIG. 19e shows a rectangular cross section 820 of the member with a layer of padding 821 on all four sides. The padding may provide cosmetic enhancement, it may also serve to protect the bicycle frame from scratching it may also act as a cushion during storage and transportation. The preferred embodiment has the padding on at least the surface that is in contact with the frame. It is anticipated that the padding is could be a conformal polymer coating such as PVC, other possible embodiments include but are not limited to a polymer sleeve, a cloth sleeve, woven Kevlar® tubing, Kevlar® tape, over molding, felt, "stick on" plastic pads, or a laminate of different materials. Polyurethane can also be used as a laminate.

FIG. 19f shows a rectangular cross section of one embodiment of the member with padding 823 on one side.

A rectangular cross sections has several advantages over a round cross section.

For an equivalent cross sectional area a rectangle may have more desirable flex properties. A circular cross section has a higher moment of inertia than a rectangular cross section of the same area. For beams of the same material and length but of different cross sections, for a given point load the beam's deflection is directly proportional to it's moment of inertia (I).

For example: the cross sectional area for a rectangular cross section 0.12 IN thick×1.20 IN wide is 0.15 IN$^2$, an equivalent circular cross section has a diameter of 0.44 IN. The moment of inertia along the wide axis, $I_x$, of the rectangle is equal to $bh^3/12$, or $1.2(0.125)^3/12=0.0002$. The moment of inertia, $I_O$, for a circular cross section with a diameter of 0.44 is equal to $\pi r^4/4$ or 0.0018 IN, which is about 9 times as stiff in the x axis. A circular cross section with the same flexibility as a 0.125×1.20 rectangle would have a diameter of 0.25 IN. A larger cross section is desirable to counter a sawing attack.

The lock system can be used to secure a motorcycle. In this case the U-shaped member is preferably wider and or thicker. If a rectangular U-shaped member is used, then the width of the U-shaped member is preferably two or more inches. For example, the width can be between two and six inches.

Rectangular cross sections facilitate a laminate construction, a sandwich of different materials having different properties could be used. Thus, the U-shaped member can be made from laminates. A flat surface provides a place for graphics, personalization and branding. A large surface area for reflective coatings may be desirable.

Figures 20A, 20B, 20C:
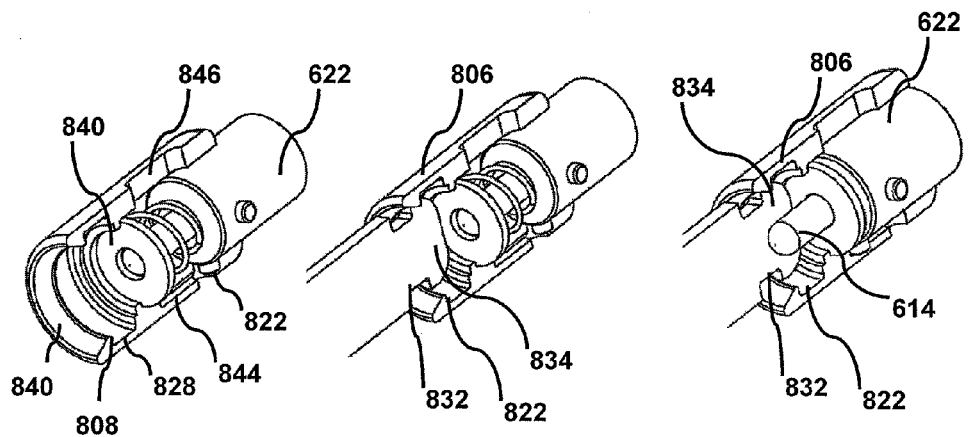

FIGS. 20a, 20b and 20c are cross sections of the figures shown in FIGS. 18a, 18b and 18c.

FIG. 20a shows the lock cylinder 622 in its unlocked and retracted position. The cross section reveals the groove 828, the ledge 808 and a chamfered lead-in 840. There is a blind slot 844 for the set screw 822 with a corresponding slot 848 to facilitate machining. An investment casting may not require the corresponding slot 848. The set screw 822 is accessable when the lock is unlocked to facilitate replacing lock cylinders. The assembly includes a washer 810 to retain the spring. It is anticipated that seals including O-ring could be employed to keep out foreign debris. Slot 846 is an access slot for machining purposes and may not be necessary.

FIG. 20b shows the lock with a tip of the flexible member with its notch 832 engaged with the groove 828 and ledge 808 of the shell 806.

FIG. 20c shows the lock with a tip 834 of the flexible member with its notch 832 engaged with the groove 828 and the ledge 808 of the shell 806 and the lock cylinder 622 and shaft 614 in the locked position. The end of the shaft 614 is shown with a full radius to help with insert between tips, a chamfer could be used instead. The flexible member is blocked from removal in this state.

Figures 21A, 21B:
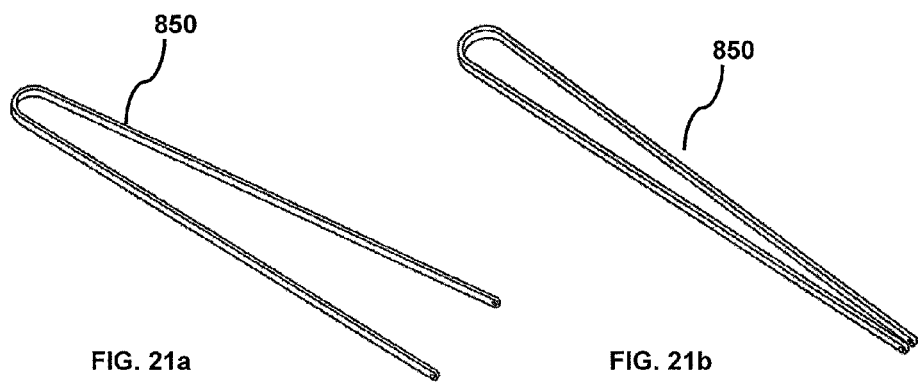
FIG. 21a illustrates a U-shaped member in a squeezed state in accordance with one aspect of the present invention.
FIG. 21b illustrates a U-shaped member in a relaxed state in accordance with one aspect of the present invention.

FIGS. 21a and 21b show the flexible member in a squeezed state and a relaxed state.

FIG. 21a shows a flexible member with a rectangular cross section in its relaxed or as manufactured state.

FIG. 21b shows a flexible member with a rectangular cross section with its tips squeezed together. The tips may be inserted into the shell of the lock body in this state.

One significant advantage of this invention is its ability to be easily stored on a bicycle frame during transportation. Many locks currently in the marketplace require special brackets that add weight and compete for precious space with water bottle holders etc. or need backpack or other bags to store U bolts, chain and cable. One embodiment of this invention can be easily lashed to the bicycle frame using hook and loop straps. Velcro® ONE-WRAP® strap part number 90476 is well suited to this application. The straps are very light, inexpensive and are not permanently attached to the frame and have the ability to hold the flexible member very securely especially when the flexible member is light and springy. They can also work on a wide variety of tube shapes and diameters without any special mounting hardware. This is not possible with other types of bike locks and bike lock brackets.

Figure 22A:
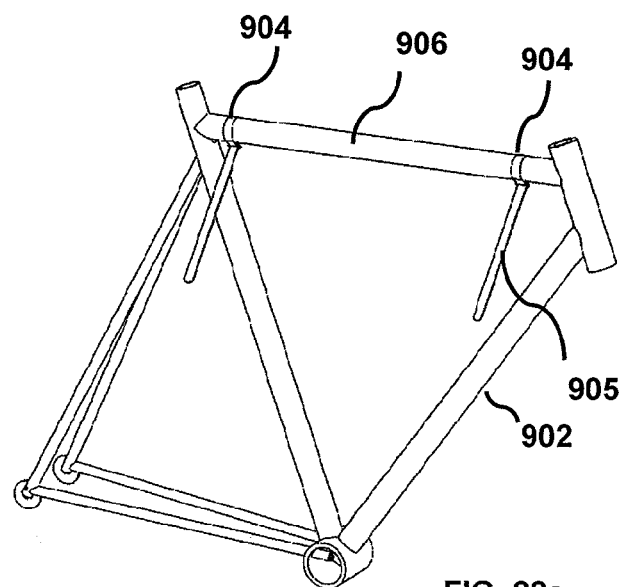
FIGS. 22a and 22b illustrate a link in accordance with one or more aspects of the present invention.

FIG. 22a shows a bicycle frame 902 with two straps 904 attached to the frame top tube 906 and ready to receive the member 850. It is anticipated that other types of straps could be used including cinch straps etc. when the member is not being stored on the frame 902 the hook and loop straps could be wound around its self and the frame top tube 906. Many cyclists have a small bag under the seat for storing tools, spare inner tubes and other items, because the lock body may be small and compact it could be stored in the bag as well. When the straps 904 are not securing the member 850 the tag ends 905 can be wrapped around the frame 906 and itself so that the tag ends 905 would not be loosely flopping around.

Figure 22B:
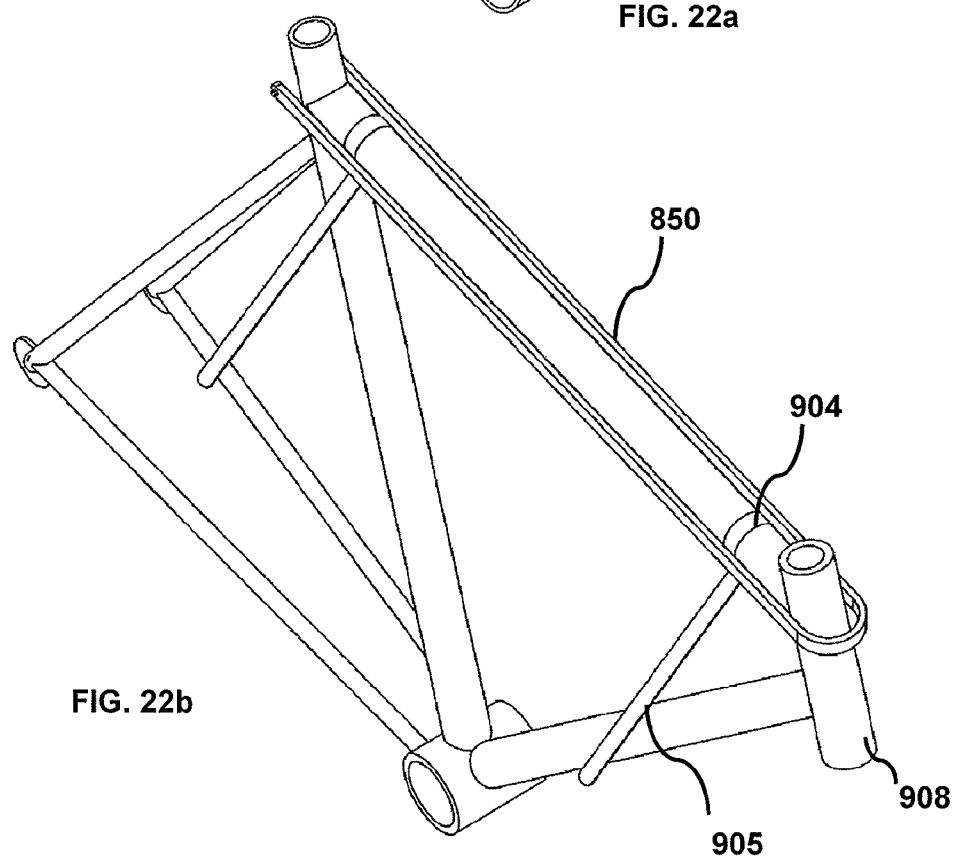

FIG. 22b shows the member 850 in place but not yet lashed. Being partially squeezed helps keep the member 850 snug, secure and rattle free because it springs outward between the frame, the strap 904 and the tag ends 905. FIG. 22b is shown with tips facing rearward, however it could be mounted with the tips facing forward. The U dimension could sized to fit all common head tubes 908. Head tubes 908 are typically less than 2.5 IN in diameter. Other brackets or mounting methods could also be employed.

Figure 23:
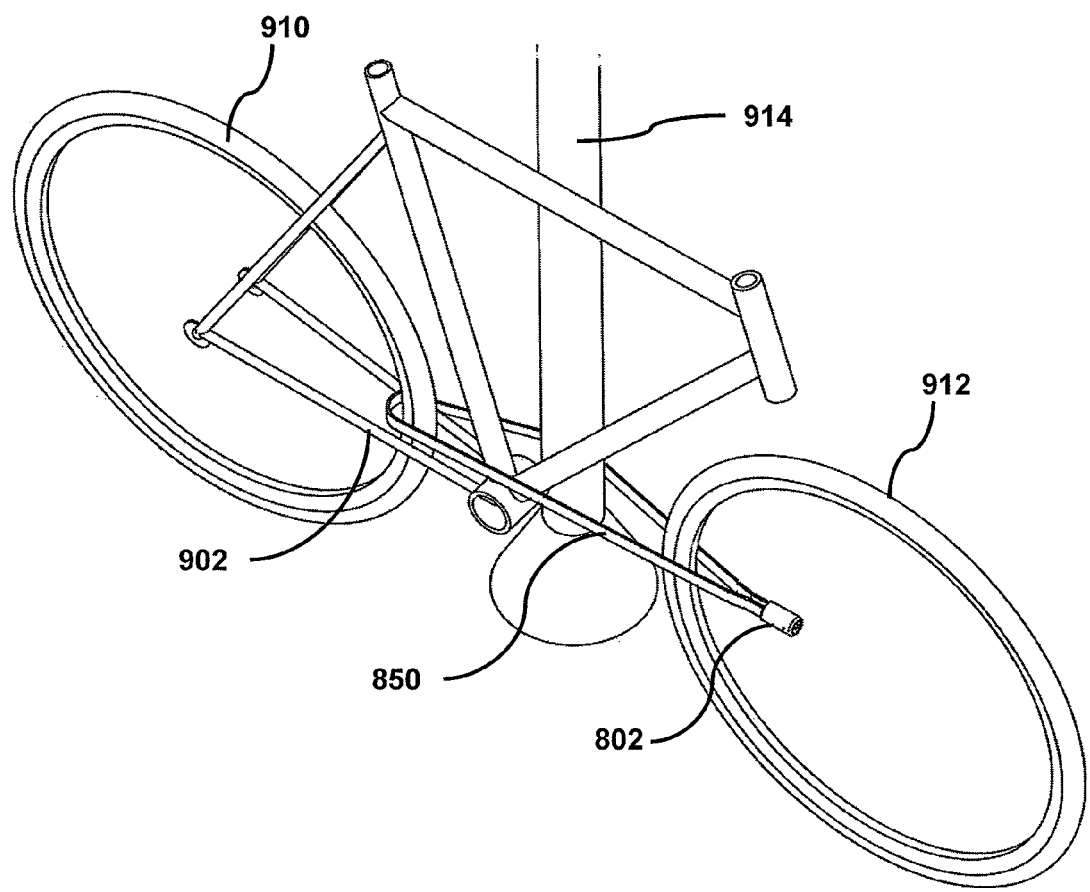
FIG. 23 illustrates the lock in accordance with one embodiment of the present invention secured to a bicycle frame and also illustrates the lock in accordance with one embodiment of the present invention securing a bicycle to a structure.

FIG. 23 shows an embodiment of this invention securing a bicycle frame and front and rear wheels to a structure. Some of the components of the bicycle are not shown for clarity. The member 850 encircles the rear wheel 910, the frame 902 a structure 914 and the front wheel 912 and is secured with a lock 802 to form a continuous loop. The member is elastically and asymmetrically deformed around the structure 914. The arrangement shown in FIG. 23 is advantageous in that it secures both the front 912 and rear 910 wheels without having to remove either one. This is not possible with many of the large U style bike locks currently in the market place. The arrangement shown also keeps the front wheel aligned which helps to keep the bike upright. Another advantage of this arrangement is that a bolt cutter can only be used from above and the jaws can only be applied to the narrow portion of the rectangular section. When the long side of the rectangular cross section of the member is longer than the jaws of the bolt cutter this method of attack is hindered.

It is anticipated that the embodiment of the invention could be arranged in many other ways to secure multiple bicycles and or other objects.

The following series of steps may be used to secure the bike and lock embodiment shown in FIG. 23:

1. Unlash the member 850 from the bike frame 902 by unwrapping the two hook and loop straps. It is anticipated that attachment devices other than hook and loop straps could be used to store the member 850 on the frame 902. The member 850 could also be stored in a backpack or other container, or kept at a location.
2. Thread the tips of the member 850 between the spokes, not shown, around the rim of the rear wheel 910.
3. Spread the arms of the member to capture the structure the frame and the rim of the front wheel 912.
4. Squeeze the tips together and insert into a lock body that is in its unlocked state.
5. Release the tips to engage the retaining elements inside the lock body.
6. Secure the lock body 802 and member 850 by pushing the lock cylinder and bar forward to fill the void between the tips.

Of course, a variety of methods can be used to secure a bicycle to a structure in accordance with various aspects of the present invention.

Another embodiment of the present invention comprises a kit. The kit comprise one or more member, such as described in FIG. 14 or 15, a locking mechanism, and at least one key for a keyed cylinder such as described in FIG. 13 or 14, and two hook and loop fasteners. In accordance with one aspect of the present invention, two keys are provided in the kit. Also, more than two hook and loop fasteners can be supplied in the kit. In a further embodiment the kit comprises the member and packaging material such as plastic clamshell packaging for displaying the metallic member. In yet a further embodiment the kit comprises the metallic member and instructions for using the member. In yet a further embodiment the kit comprises the member, the locking mechanism and packaging material such as a plastic clamshell packaging for displaying the member.

The present invention includes a method of locking a bicycle to a structure using a member and locking mechanism. The method comprises surrounding a structure, such as a sign post, bike rack, telephone pole or a tree, with a member, such as described in FIG. 14 or 15. Another step of the method is further surrounding the bicycle, preferably the frame, with the member. Another step is placing a first end of the member in an aperture, and then placing a second end of the member in the aperture or in a second aperture. Another step is using a locking mechanism, such as described in FIG. 13 or 14, to fill a void to secure the first end and the second end of the member with the locking mechanism.

In accordance with one aspect of the present invention, the lock weighs less than 5.5 Ounces. In accordance with another aspect of the present invention, the U-shaped lock and the locking mechanism weighs less than 12 Ounces. In accordance aspect of the invention, the locking mechanism weighs less than 16 ounces.

It is to be understood that the link of the present invention can be provided as part of a bicycle frame. Thus, the slots described herein can be provided as part of a flange that is part of the bicycle frame or that is permanently attached to the frame.

A number of embodiments of the invention have been described. Nevertheless, it will be understood that various modifications may be made without departing from the spirit and scope of the invention. Accordingly, other embodiments are within the scope of the following claims.

The invention claimed is:

1. A lock for securing an object to a structure comprising:
   a U-shaped member comprising an elastically deformable material that retains a shape, the U-shaped member having a first arm, a second arm, a first engaging element formed at an end of the first arm and a second engaging element formed at an end of the second arm;
   a locking mechanism having one or more interfaces that engage the first engaging element and the second engaging element of the U-shaped member when the end of the first arm and the end of the second arm are inserted inside the locking mechanism, the locking mechanism having a bar that moves between a locked position such that the bar is between the end of the first arm and the end of the second arm of the U-shaped member and an unlocked position such that the bar is not between the end of the first arm and the end of the second arm of the U-shaped member, wherein the locking mechanism comprises a piston lock located within a shell and wherein the moving bar is a rod in the piston lock that moves with axial motion to substantially fill a void between the first engaging element and the second engaging element and wherein the first engaging element and the second engagement elements are notches.

2. The lock of claim 1, further comprising two hook and loop fasteners.

3. The lock of claim 2, wherein the hook and loop fasteners attach the apparatus to a bicycle.

4. The lock of claim 1, wherein the U-shaped member is a treated metal.

5. The lock of claim 1, wherein the U-shaped member is constructed from a material selected from the group consisting of aluminum, aluminum alloy, titanium, titanium alloy, steel, and alloy steel.

6. The lock of claim 1, wherein the U-shaped member is constructed with laminated layers.

7. The lock of claim 1, wherein the U-shaped member is titanium alloy.

8. The lock of claim 1, wherein the U-shaped member has a circular cross section.

9. The lock of claim 1, wherein the U-shaped member has a rectangular cross section.

10. The lock of claim 9, wherein the U-shaped member has a width in the range of three quarters of an inch to one inch.

11. The lock of claim 9, wherein the U-shaped member has a width in the range of one-half of an inch to two inches.

12. The lock of claim 1, wherein the U-shaped member has at least one side and that side has a protective layer.

13. A lock for securing an object to a structure comprising:
a U-shaped member comprising an elastically deformable material that retains a shape, the U-shaped member having a first arm, a second arm, a first engaging element formed at an end of the first arm and a second engaging element formed at an end of the second arm;
a locking mechanism having one or more interfaces that engage the first engaging element and the second engaging element of the U-shaped member when the end of the first arm and the end of the second arm are inserted inside the locking mechanism, the locking mechanism having a bar that moves between a locked position such that the bar is between the end of the first arm and the end of the second arm of the U-shaped member and an unlocked position such that the bar is not between the end of the first arm and the end of the second arm of the U-shaped member, wherein the locking mechanism comprises a piston lock located within a shell and wherein the moving bar is a rod in the piston lock that moves with axial motion to substantially fill a void between the first engaging element and the second engaging element; and wherein the first engaging element and the second engagement elements are pins.

14. A lock for securing an object to a structure comprising:
a U-shaped member comprising an elastically deformable material that retains a shape, the U-shaped member having a first arm, a second arm, a first engaging element formed at an end of the first arm and a second engaging element formed at an end of the second arm;
a locking mechanism having one or more interfaces that engage the first engaging element and the second engaging element of the U-shaped member when the end of the first arm and the end of the second arm are inserted inside the locking mechanism, the locking mechanism having a bar that moves between a locked position such that the bar is between the end of the first arm and the end of the second arm of the U-shaped member and an unlocked position such that the bar is not between the end of the first arm and the end of the second arm of the U-shaped member, wherein the locking mechanism comprises a piston lock located within a shell, the shell having the one or more interfaces which are two holes, and wherein the moving bar is a rod in the piston lock that moves with axial motion to fill a void between the first engaging element and the second engaging element and wherein the first engaging element and the second engagement elements are pins.

15. A lock for securing an object to a structure comprising:
a U-shaped member comprising an elastically deformable material that retains a shape, the U-shaped member having a first arm, a second arm, a first engaging element formed at an end of the first arm and a second engaging element formed at an end of the second arm;
a locking mechanism having one or more interfaces that engage the first engaging element and the second engaging element of the U-shaped member when the end of the first arm and the end of the second arm are inserted inside the locking mechanism, the locking mechanism having a bar that moves between a locked position such that the bar is between the end of the first arm and the end of the second arm of the U-shaped member and an unlocked position such that the bar is not between the end of the first arm and the end of the second arm of the U-shaped member, wherein the locking mechanism comprises a piston lock located within a shell, the shell having the one or more interfaces which are two holes, and wherein the moving bar is a rod in the piston lock that moves with axial motion to fill a void between the first engaging element and the second engaging element and wherein the first engaging element and the second engagement elements are notches.

\* \* \* \* \*